Dec. 3, 1957                J. VON NEUMANN                2,815,488
                NON-LINEAR CAPACITANCE OR INDUCTANCE
                        SWITCHING, AMPLIFYING
Filed April 28, 1954        AND MEMORY ORGANS            7 Sheets-Sheet 1

INVENTOR
John Von Neumann
BY
Davis Hope & Faithfull
ATTORNEYS

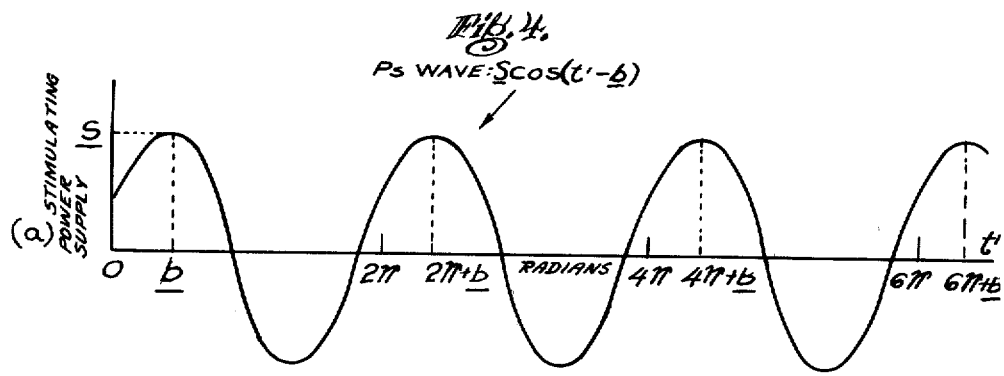
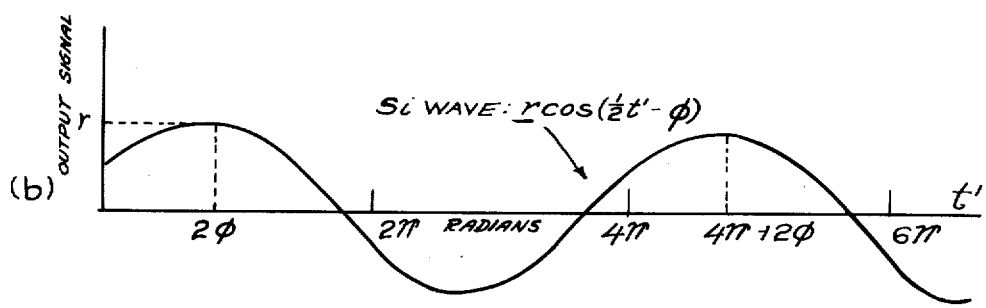
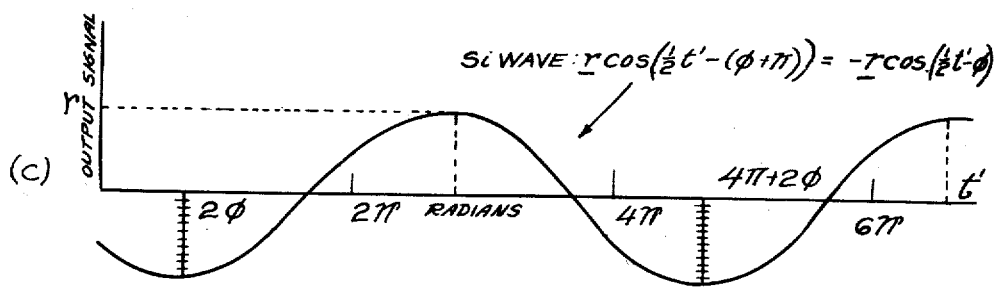
$t' = 2\pi f_1 \cdot t$

Dec. 3, 1957  J. VON NEUMANN  2,815,488
NON-LINEAR CAPACITANCE OR INDUCTANCE
SWITCHING, AMPLIFYING
AND MEMORY ORGANS
Filed April 28, 1954  7 Sheets-Sheet 3
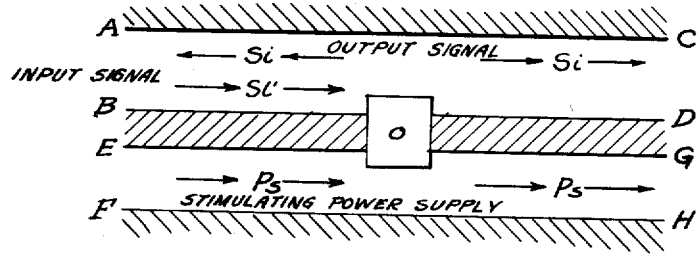
Fig. 5.
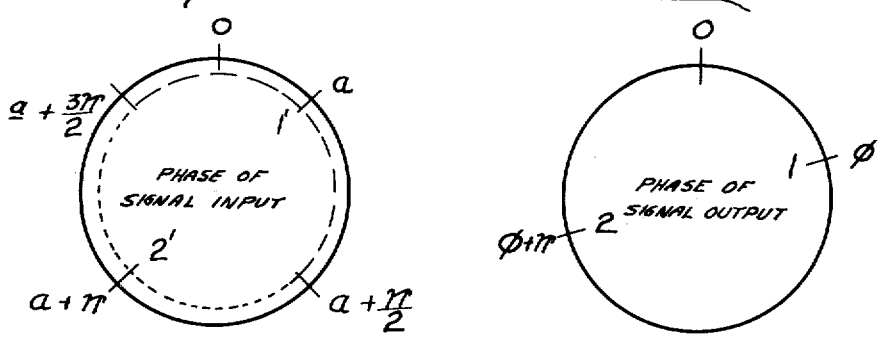
Fig. 6
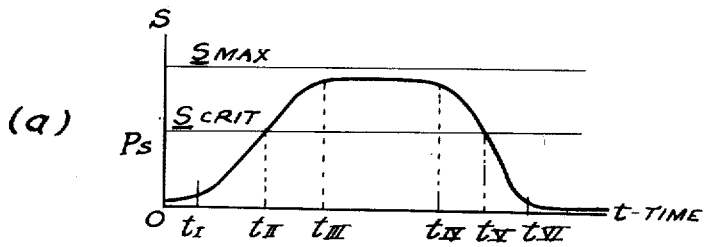
Fig. 7
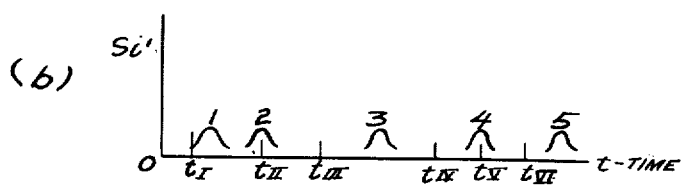
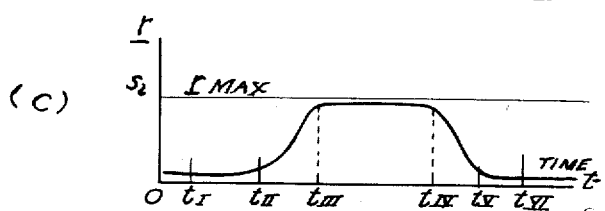
INVENTOR
John Von Neumann
BY
Davis Hoxie & Faithfull
ATTORNEYS Dec. 3, 1957  J. VON NEUMANN  2,815,488
NON-LINEAR CAPACITANCE OR INDUCTANCE
SWITCHING, AMPLIFYING
AND MEMORY ORGANS
Filed April 28, 1954  7 Sheets-Sheet 4
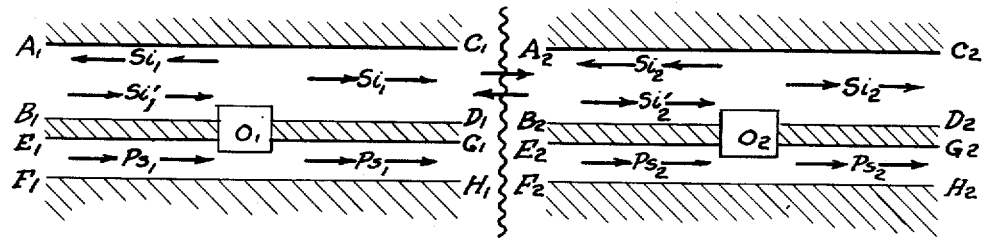
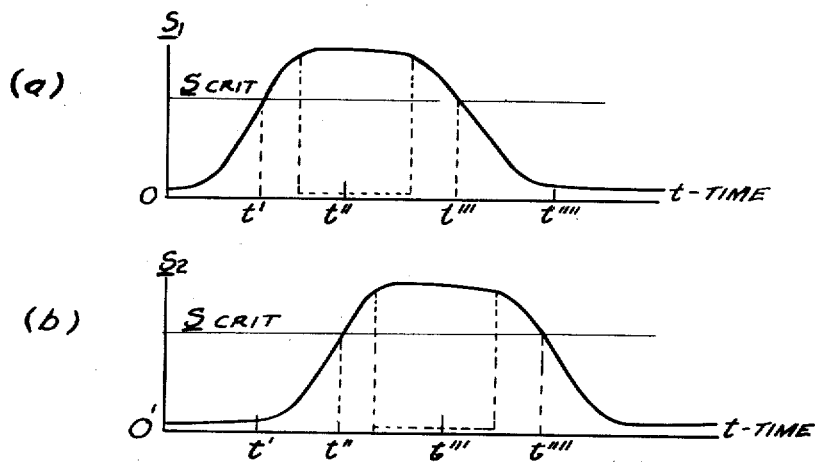
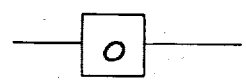
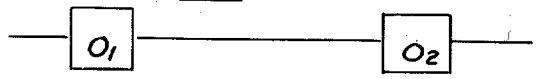
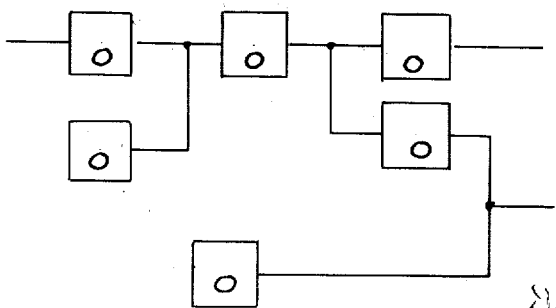
INVENTOR
John Von Neumann
BY
Davis Hoxie & Faithfull
ATTORNEYS Dec. 3, 1957  J. VON NEUMANN  2,815,488
NON-LINEAR CAPACITANCE OR INDUCTANCE
SWITCHING, AMPLIFYING
AND MEMORY ORGANS
Filed April 28, 1954  7 Sheets-Sheet 5
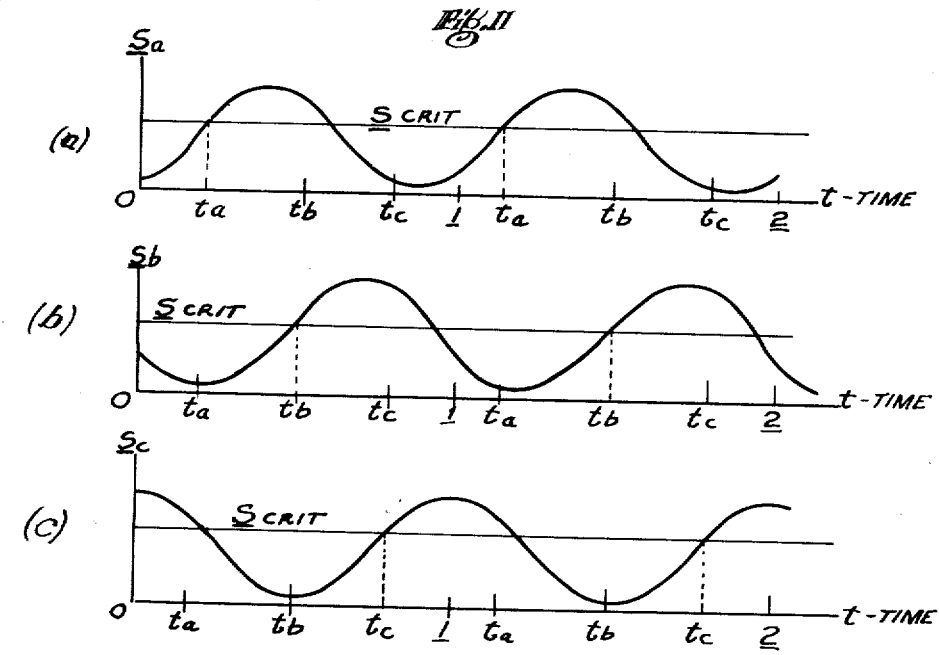
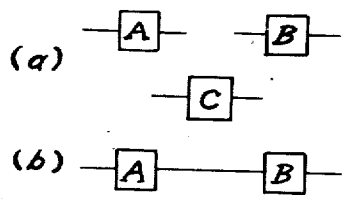
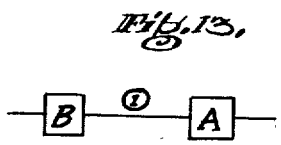
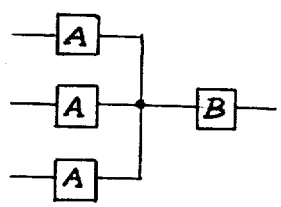
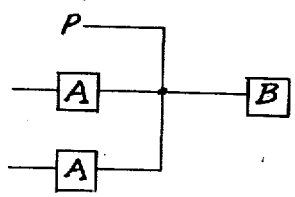
INVENTOR
John Von Neumann
BY
Davis Hope & Faithfull
ATTORNEYS Dec. 3, 1957 J. VON NEUMANN 2,815,488
NON-LINEAR CAPACITANCE OR INDUCTANCE
SWITCHING, AMPLIFYING
AND MEMORY ORGANS
Filed April 28, 1954 7 Sheets-Sheet 6

INVENTOR
*John Von Neumann*
BY
*Davis Hoxie & Faithfull*
ATTORNEYS

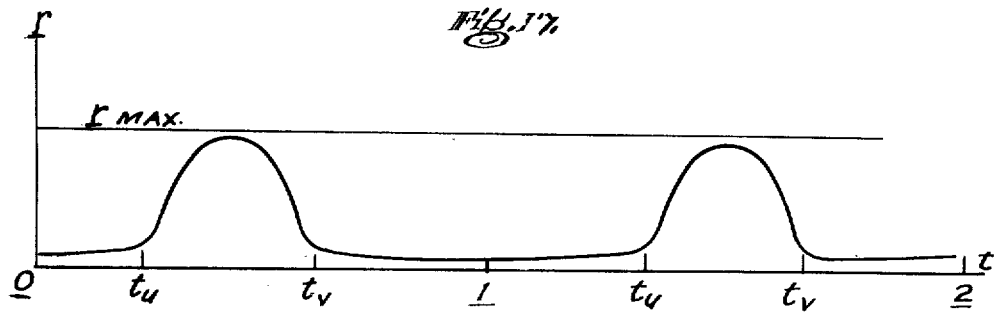

United States Patent Office 2,815,488
Patented Dec. 3, 1957

2,815,488

NON-LINEAR CAPACITANCE OR INDUCTANCE SWITCHING, AMPLIFYING, AND MEMORY ORGANS

John Von Neumann, Princeton, N. J., assignor to International Business Machines Corporation, New York, N. Y.

Application April 28, 1954, Serial No. 426,149

10 Claims. (Cl. 332—52)

(0.1) Logical machines, so called, which perform complicated control, switching, and information and data handling functions, are at present mainly based on the vacuum tube as a basic component. High speed, long life, and great reliability are their most important and desirable traits.

(0.2) In view of the great complexity of such machines, their vacuum tube components cannot be driven at the highest speeds at which vacuum tubes might be individually operable.

Vacuum tubes are, furthermore, inherently mechanically sensitive and age-limited devices. They pose considerable maintenance and replacement requirements, with a corresponding reduction of the productive time fraction of the machine. Also, the average vacuum tube dissipates several watts of power, so that a large computing machine's total power dissipation may range from 20 to 200 kilowatts. This is released as heat, and hence requires elaborate cooling arrangements and not inconsiderable volume in space. The geometrical arrangement of the various components is thereby forced on a larger scale, thus introducing greater linear distances than are desirable electrically, especially at high operating speeds.

(0.3) Because of these, and other similar limitations of vacuum tubes it is desirable to replace them by other devices, which are faster, or smaller (more compact), or dissipate less heat, or have more constant properties, greater reliability or longer life. Any combination of some of these attributes, or of all of them, is likely to lead to interesting and worthwhile devices. Various solid state devices are particularly promising from the point of view of progress in some or in all of these respects.

Thus the logical functions of vacuum tubes, i. e., switching, also the sensing of conjunctions, disjunctions, parities, etc., etc. have also been achieved by rectifier crystal diodes and their combinations. Switching, coincidence sensing, and memory functions have been implemented by ferromagnetic cores, and the use of ferroelectric substances in this area is also beginning. Crystal triodes (transistors) are being used for amplification, etc., etc.

All these are necessary functions for logical (e. g. computing) machine components, and a complete, large scale machine is likely to require all of them.

These functions also play important and necessary roles in various less complicated information processing machines. These include machines that generate and emit, or receive and process or interpret, various kinds of complex signals. This includes the case of multiple messages on a single channel, which have to be separated; coded or otherwise transformed messages which have to be restored; complex message systems like those involved in television; etc. It applies to communications proper, to radar signals, etc. It is desirable to replace vacuum tubes in such uses also, by novel components which have advantages as discussed at the beginning of this section.

(0.4) The purpose of my invention is to produce a novel and superior organ capable of performing all of these functions. The principle of the invention may be stated, in general terms, as follows:

The basic element of the novel organ may be any electromagnetic device possessing both capacitance and inductance and therefore a resonant frequency for small oscillations about its state of equilibrium. Also, at least one of these two reactances must be nonlinear. To excite this device there is provided an amplitude modulated electromagnetic wave power supply capable of impressing on the device a potential at a certain basic frequency. There is also provided an additional input signal at a second definite frequency. These two together will, under suitable conditions, elicit from this device a particular type of response or output signal because of its non-linear nature in its non-dissipative feature (namely, in its capacitance or in its inductance). It is characteristic of this type of response that the complex amplitude (i. e., the ordinary—positive—amplitude multiplied by the—complex—phase factor) of the output signal undergoes greater variations than the complex amplitude of the input signal. This is amplification. It may occur concurrently with or subsequently to the presence of the input signal, at any rate it will occur in a definite period of time, determined by the subsequent amplitude modulation pattern of the power supply. It may, for a suitable power supply amplitude modulation pattern, last, in its amplified form, beyond the duration of the input signal. In this case it exhibits memory and hysteresis. By various superposition expedients affecting the input signals, all logical and switching functions can be obtained.

(0.5) All these procedures, and in particular those in the cases of harmonic response and of subharmonic response, can be implemented by numerous electromagnetic devices, many of them being solid state devices.

Among the solid state devices, the crystal diode, which possesses a non-linear capacitance, deserves special mention. In addition to the usual advantages of solid state devices it exhibits especially high speed—probably several 100, and up to 1000 times faster than the conventional vacuum tubes used as referred to above. I prefer therefore as the chosen electromagnetic device a crystal diode having a non-linear capacitance.

In the following description and accompanying drawings the suitable conditions of the power supply and of the input signal under which such devices will operate in accordance with my invention, and the particular types of response, or output signal, of such devices to which I have referred, are more specifically disclosed.

Fig. 4 is a graphical representation of the variations in excursion of various organ stimuli as a function of time;

Fig. 5 is a schematic view similar to Fig. 2 with the input signal added;

Fig. 6 shows circle diagrams of the phase of the input and output signals respectively;

Fig. 7 is a graphical representation of the amplitudes of the stimulating power supply, input signal and output signal as functions of time;

Fig. 8 is a schematic view similar to Fig. 5 of two interconnected organs;

Fig. 9 is a graphical representation of the variations of the amplitudes of the stimulating power supplies of the organs shown in Fig. 8;

Fig. 10 is a schematic representation of various organ connections;

Fig. 11 is a graphical representation similar to Fig. 9 showing the variations of the amplitudes of the power supplies for three interconnected organs;

Fig. 12 is a schematic view showing the manner of designating different organs having power supplies with different relative phases;

Fig. 13 is a schematic view showing the manner of designating a particular form of control;

Fig. 14 is a diagrammatic view showing the connections for a majority organ;

Fig. 15 is a diagrammatic view showing a special form of the majority organ (disjunction);

Fig. 17 is a graphical representation of the amplitude of the organ output as a function of time;

Figure 2:
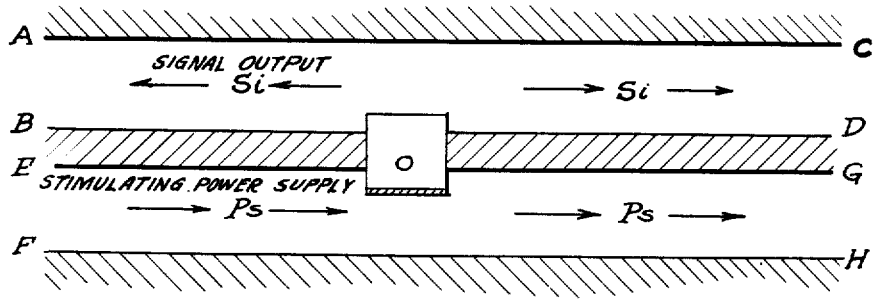
Fig. 2 is a generalized schematic view of the basic elements of a switching organ.

Since my invention is capable of embodiment with types of organs for which the appropriate connecting channels may be wave guides or coaxial cables, or suitable cavity and conductor arrangements or conventional transmission lines or ordinary wires, I have in the schematic views, Figs. 2, 5 and 8, adopted illustrative schematic conventions which may be taken to represent the scheme for all applications of the underlying principles. Thus, the conducting channels are $$\frac{AB}{CD} \text{ and } \frac{EF}{GH}$$

and the organ of whatever type is represented by a rectangle associated with these channels. It should be emphasized at this point, that the actual geometrical arrangements of Fig. 2 must not be taken literally. The positioning of the two channels and of the organ O permits wide variations from the schema of Fig. 2. The fact that the organ rectangle penetrates both channels is meant to indicate that it is electromagnetically linked to both of them.

(0.6) In the first example the organ O is a crystal diode. The operating frequencies are likely to be very high, in the 1000 to several 10,000 megacycles per second. The connecting channels are wave guides, or appropriately treated coaxial cables, or suitable cavity and conductor arrangements, etc. The channels may merge in a common cavity at O. O is linked to them by suitable electromagnetic elements or antennae, etc. The power sources are very high frequency tubes, or special short wave generators, like magnetrons, klystrons, etc.

(0.7) In the second example, O is a saturable magnetic core, possibly, but not necessarily, ferromagnetic. The operating frequencies are likely to be lower, say, in the range of one or several megacycles per second. The connecting channels may now be conventional transmission lines, or even ordinary wires. O is linked to these lines inductively, e. g., by one or more turns of each line around O. The power sources are ordinary vacuum tube oscillators in the megacycle range.

(0.8) The devices described here can also be used in other ways as circuit elements. In this respect their capabilities in wave shaping, i. e., in producing steep wave fronts, square waves, etc., should be mentioned.

(1.1) My invention, as has been pointed out (0.4), deals with the application of electromotive forces under certain suitable conditions to an electrical organ O which has the following properties:

(a) It contains both capacitance and inductance, and at least one of these two reactances is nonlinear.

(b) Its dissipation is not too great in comparison with nonlinearity mentioned in (a). This dissipation may be resistive—in parallel or in series with the nonlinearity of (a)—or it may be a hysteresis of the nonlinear element (e. g. the inductance hysteresis of a ferromagnet, etc.).

(1.2) Although the capacitance and/or the inductance of O must be non-linear, and its other electrical characteristics (e. g., one or more of its resistive elements) may be, the organ will behave approximately linearly for small excitations near its quiescent state. Like any inductive-capacitive system with a relatively low dissipation, it can therefore then perform somewhat damped, approximately harmonic oscillations around this quiescent state, its state of equilibrium. The frequency of these oscillations is O's zero-limit resonant frequency, or, briefly, its resonant frequency, to be designated by $f_0$.

(1.3.1) The crystal diode, which has a nonlinear capacitance, is a particularly important example of devices having the foregoing properties, and I will now give it particular attention in the special case in which the frequency of the signal response is one-half the frequency of the power supply (i. e., $n=2$). In the immediately following discussion, therefore, the suitable conditions of the power supply and of the input signal and the particularities of the response or output signal that characterize my invention are discussed with reference to that particular embodiment in which the organ is a crystal diode having non-linear capacitance and the operating conditions are those which prevail when the resonant frequency of the diode circuit lies close to the subharmonic $n=2$ of the frequency of the power supply, i. e., is approximately one-half the power supply frequency.

Figure 1:
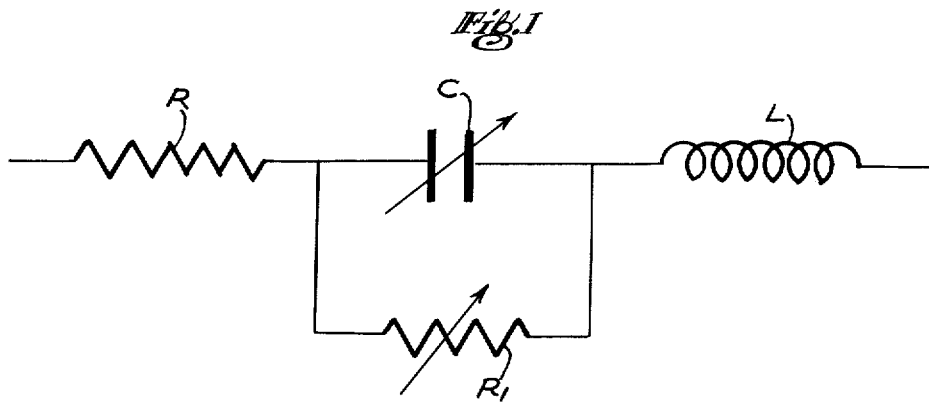
Fig. 1 is a wiring diagram of the equivalent circuit of a crystal diode.

(1.3.3) The electrical schema of the crystal diode, i. e., its equivalent circuit, when reduced to its essentials, is shown in Fig. 1. Here R is the (linear) bulk resistance of the crystal, C its (non-linear) "barrier" capacitance, $R_1$ its (non-linear, i. e., rectifying) "barrier" resistance, L the (linear) inductance, mainly in the whisker. For e. g. a welded contact crystal at .1—.2 volt forward bias, the barrier resistance $R_1$ is usually so large (e. g. typically 5000 ohms) compared to the bulk resistance R (e. g. typically 5 ohms) and the resonant characteristic resistance $$R_{ch} = \sqrt{\frac{L}{C}}$$

(e. g. typically 700 ohms), that its role is irrelevant and may, in a first approximation, be neglected.

Other circuit complications, due to the crystal's cartridge and connections, etc., affect its use, but they, too, do not impair or alter, when properly used, the validity of the principles that I will discuss.

The resonant frequency, referred to above, is, of course $$f_0 = \frac{1}{2\pi\sqrt{LC}}$$

(1.4.1) The proposed use of the organ O, e. g. of the crystal diode, in the sense of 1.3.1, is this:

Let O be irradiated by a suitable form of wave power of a certain frequency $f_1$. Let a certain moderate, integer fraction of $f_1$ be near O's proper frequency $f_0$.

(1.4.4) Under such conditions O will respond to the irradiation of frequency $f_1$ by a stimulated radiation of its own, of a frequency that lies close to its resonant frequency $f_0$—namely of the frequency $$\frac{1}{n}f_1$$

In the special case now under consideration where $n=2$ the response will be $$\frac{1}{2}f_1$$

I will call the original irradiation, of frequency $f_1$, the power supply, and the stimulated (or response) radiation, of frequency $\frac{1}{2}f_1$ (which is $\approx f_0$) the signal.

Under these conditions, upon a strong power supply Ps (frequency $f_1$) irradiation, O will respond by emitting a very weak radiation of the same kind (frequency $f_1$), and an intermediate (i. e. weaker than $Ps$ but much stronger than the frequency $f_1$ response) signal $Si$ (frequency $\tfrac{1}{2}f_1$) radiation. Thus the stimulating power supply radiation $Ps$ in

EG
FH induces a response signal radiation $Si$ in

AC
BD

The above, however, is true with this qualification. The amplitude $r$ of the response $Si$ (at O) is determined by the amplitude $s$ of the stimulus $Ps$ (at O). This function $r$ of $s$ has the appearance shown in Fig. 3, i. e., it is of the above mentioned "intermediate" strength only when $s$ exceeds a certain critical stimulus level $s_{crit}$. When $s$ is less than $s_{crit}$, the (subharmonic) response $Si$ is absent (i. e. $r=0$). When $s$ is more than $s_{crit}$, an "intermediate" strength response $Si$ appears (cf. above), and it can be made quite strong (i. e. $r$ quite large) by making the stimulus $Ps$ sufficiently strong (i. e. $s$ sufficiently large).

(1.5.5) Not only does the amplitude $s$ of $Ps$ determine the amplitude $r$ of $Si$ (cf. Fig. 3), but the phase $b$ of $Ps$ also determines the phase $\phi$ of $Si$ (if $s$ is given and $>s_{crit}$, so that $r>0$). This means the following.

The stimulus, i. e. $Ps$ wave (at O) has the appearance shown in Fig. 4a, in which the ordinate $t'$ is expressed in radians. Also, all phases are taken relatively to an arbitrarily fixed zero of $t$, i. e. of $t'$.

A full period of the $Ps$ wave is shown in Fig. 4a between the two | lines at $b$ and $2\pi+b$ (on the $t'$-axis), two further ones are shown between $2\pi+b$ and $4\pi+b$, and between $4\pi+b$ and $6\pi+b$.

The response, i. e. the $Si$ wave (at O) is shown in Fig. 4b, which is drawn for the case $n=2$. Hence a full period of the $Si$ wave is twice as long as that of the $Ps$ wave. Such a full period of the $Si$ wave is shown in Fig. 4b between the two | lines at $2\phi$ and $4\pi+2\phi$. (I prefer to write from here on $\phi$ for this particular value of $\phi$, rather than just $\phi$.

As I stated above, $b$ determines $\phi$ ($s$ being given and $>s_{crit}$). However, this determination is ambiguous to this extent. (I am still assuming $n=2$.) Increasing $2\phi$ by $2\pi$, i. e. replacing it by $2\phi+2\pi$, shifts both ($a$) and ($b$) in Fig. 4 to the right by $2\pi$. In Fig. 4a this $2\pi$ is a full period, i. e. the stimulus, goes over into itself, absolutely unchanged. In Fig. 4b, however, this $2\pi$ is a half period, i. e. the response, goes over into Fig. 4c, which differs from it substantially. (($c$) happens to be opposite equal to ($b$), but this is not essential.)

Thus the same stimulus $Ps$ can produce two different responses $Si$. These differ from each other by $\pi$ in their own phase—indeed I replaced $2\phi$ by $2\phi+2\pi$, i. e. $\phi$ by $\phi+\pi$—i. e. in the frequency $\tfrac{1}{2}f_1$, hence they are different. Yet, they differ from each other by $2\pi$ in the phase of the stimulus, i. e. in the frequency $f_1$, hence both have the same relation to the stimulus—i. e. both can be equally induced by that stimulus. The phase shift between stimulus and response, caused by O, is, as Fig. 4a to 4c show, $2\phi-b$ in the phase of the stimulus (frequency $f_1$). Passing from ($b$) to ($c$), i. e. from $\phi$ to $\phi+\pi$, changes this phase shift by $2\pi$—i. e. not at all from the point of view of the stimulus.

Figure 3:
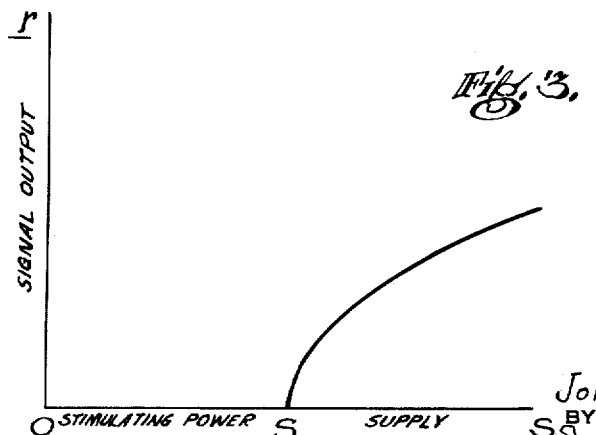
Fig. 3 is a graphical representation of the organ response amplitude as a function of the amplitude of the stimulating power supply in the subharmonic case.

(1.5.6) The discussion of 1.4.4—1.5.5 shows that a stimulus $Ps$ with given amplitude $s$ produces no subharmonic response when $s<s_{crit}$, and a subharmonic response $Si$ with a definite amplitude $r>0$ when $s>s_{crit}$, i. e., this $r$ is an increasing function of $s$, as shown in Fig. 3. For $s>s_{crit}$ the phase $\phi$ of the response $Si$ is also determined by the phase $b$ of the stimulus $Ps$ (given $s$), but there are 2 values of $\phi$—differing consecutively by $\pi$, i. e. by a half period of the response $Si$ (which is, of course, a full period of the stimulus)—with one (given) value of $b$. I. e., the subharmonic response exists when and only when $s>s_{crit}$, it is then definite in its amplitude $r$, but 2-way quantized in its phase $\phi$.

(1.6.1) Returning once more to Fig. 2, let the stimulus $Ps$ be absent, or at any rate have an amplitude $s<s_{crit}$. Now let $s$ increase, i. e. the stimulus $Ps$ grow stronger, suddenly or gradually. Let $s$ in this way become $>s_{crit}$, and finally reach a preselected value $s_{max}>s_{crit}$.

As long as $s<s_{crit}$, no subharmonic response $Si$ is present. As $s$, in increasing, crosses the value $s_{crit}$, the subharmonic response $Si$ sets in. When $s$ reaches $s_{max}$, the amplitude $r$ of $Si$ reaches its corresponding (maximum) value $r_{max}$. At this moment 2 phases for $Si$ are possible. Which of these is realized is indeterminate. I. e. it depends on the minor, accidental, details of the process involved in increasing $s$. Actually the exact circumstances at the time when $s$ (increasing) crosses the value $s_{crit}$ are the important ones—i. e., they alone matter.

This phase indeterminacy is, as I have shown, an ability of the phase $\phi$ to lock in on either one of 2 distinct (actually phase-equidistant), "quantized," values. This selection (of one of these 2 phase values) seems to be quite fortuitous, but it can be controlled by a very simple device.

(1.6.2) The control is exercised by irradiating O with a very weak wave of the signal type, i. e. of frequency $\tfrac{1}{2}f_1$, at the time when $s$ (increasing) crosses $s_{crit}$. To be precise: The irradiation by a very weak wave of the signal type may occur at any time, but it will never produce any relevant effect (i. e. response), except at the time when $s$ (increasing) crosses $s_{crit}$.

Let me designate this signal type wave by $Si'$. In the representation of Fig. 2 it must come to O through the channel

AC
BD since its frequency is $\tfrac{1}{2}f_1$. Let it come from the

A
B side. The situation that arises is shown in Fig. 5. This is a repetition of Fig. 2 (except that I have here indicated the presence of the input or control signal $Si'$). Note that the incoming signal $$Si' \text{ in } \begin{matrix} AC \\ BD \end{matrix}$$

goes on past $$O \left( \text{to } \begin{matrix} C \\ D \end{matrix} \right)$$

but since it is much weaker than the outgoing (response) signal $Si$ (when this is effective, cf. 2.1.4.), that signal makes this irrelevant.

(1.6.3) The sequence of events is now as follows.

The input in E/F is the stimulus $Ps$ (frequency $f_1$) whose amplitude $s$ increases in the critical time interval from near zero (or at any rate from $s<s_{crit}$) to a value $s_{max}$ (which is $>s_{crit}$). When $s$ (increasing) crosses $s_{crit}$ a second radiation comes in, the input signal $Si'$ (frequency $\tfrac{1}{2}f_1$) from $\begin{matrix}A\\B\end{matrix}$ ($Si'$ may come at other times, too, but those occurrences are ineffective.) Let $p$ be the amplitude and $a$ the phase of the input signal $Si'$ at O. I. e., with the same notations as those used in Fig. 4a to 4c, let the $Si'$ wave (at O) be $p \cos \tfrac{1}{2}t'-a$. (Where $t'=2\pi f_1 \cdot t$, cf. Fig. 4.)

Now there will be a certain value of the phase $a$ of the input signal, say $\bar{a}$, which will cause the subharmonic response $Si$ of $O$, which develops as $s$ increases above $s_{crit}$ and to $s_{max}$, to assume the definite phase $\bar{\phi}$—and not the other possible phase $\bar{\phi}=\pi$. Changing the phase in the frequency $\frac{1}{2}f_1$ signal radiations by $Si'$ and $Si$ by $\pi$, changes the phase in the frequency $f_1$ stimulating radiations $Ps$ by $2\pi$, i. e., not at all. Hence an input signal whose phase is $\bar{a}+\pi$ will similarly select unambiguously for the output signal the definite phase $\bar{\phi}+\pi$.

(1.6.4) Even more is true: If the phase $a$ of the input signal lies btweeen $$\bar{a}-\frac{\pi}{2} \text{ and } \bar{a}+\frac{\pi}{2}$$

then for the signal output response the definite phase $\bar{\phi}$ is selected, and if the input signal phase lies between $$\bar{a}+\frac{\pi}{2} \text{ and } \bar{a}+\frac{3\pi}{2}$$

then the definite phase $\bar{\phi}+\pi$ is selected.

This situation is illustrated in Fig. 6. Here the phases $a$ and $\phi$ are shown on two circles, which should be thought of as having radii 1, i. e. peripheries $2\pi$, thus exhibiting the period $2\pi$ of the phases. The figure is drawn for $n=2$. It shows, how the phase $a$ of the input signal $Si'$ determines the phase $\phi$ of the output signal $Si$ in a stable and quantized way. Indeed the entire $a$ phase interval $1'$ (marked $---$) selects one specific $\phi$ phase, namely 1 (i. e. $\bar{\phi}$); and the entire $a$ phase interval $2'$ (marked $\ldots$) selects one specific $\phi$ phase, namely 2 (i. e. $\bar{\phi}+\pi$).

(1.7.1) In the light of the discussions of 1.6.3—1.6.4, the behavior of the scheme of Fig. 5 can be summarized as follows.

The whole behavior is controlled by the power level of the stimulus $Ps$ (frequency $f_1$). Instead of the power level I will use (equivalently) the amplitude $s$ of the $Ps$ wave. Let me assume, for the sake of illustration, that this is first near zero (or at any rate $<s_{crit}$), then increases to a value $s_{max}$ (which is $>s_{crit}$), then stays near that value, and finally decreases again to near zero (or at any rate to $<s_{crit}$). This cycle is shown in Fig. 7a.

The changes of the $Ps$ amplitude $s$ shown in Fig. 7a must be adiabatic, i. e. slow compared to wave motions of the frequency $f_1$ and even $$\frac{1}{n}f_1$$

I. e., the curve of Fig 7a must be quite flat compared to the curves of Figs. 4a–4c, when all of these are brought to the same true $t$ scale.

The relevant time marks in this cycle are $t_I$, when $s$ begins to increase, $t_{II}$, when it crosses $s_{crit}$ (increasing), $t_{III}$ when it has reached its culmination ($s_{max}$), $t_{IV}$, when it starts decreasing, $t_V$, when it crosses $s_{crit}$ (decreasing), and $t_{VI}$, when it has reached its minimum (near zero).

The signal output $Si$ (frequency $\frac{1}{2}f_1$—this is the subharmonic response) will, accordingly, last from $t_{II}$ to $t_V$, and culminate (at $r_{max}$, which corresponds to $s_{max}$) from $t_{III}$ to $t_{IV}$. This is shown in Fig. 7c.

These arrangements would still leave the phase $\phi$ of the signal output $Si$ in a 2-way indeterminacy. This indeterminacy can now be removed, in the sense 1.6.2—1.6.4, by using a signal input $Si'$ (frequency $\frac{1}{2}f_1$). If $Si'$ reaches $O$ at the time when $s$ crosses $s_{crit}$ (increasingly), i. e. overlapping $t_{II}$, then its phase $a$ determines $\phi$, i. e. effects the above mentioned selection, unambiguously, as discussed in 1.6.4. If $Si'$ reaches $O$ at any other time, then it produces no relevant effect (cf. the beginning of 1.6.2.).

The possibilities for the arrival of $Si'$ are shown in Fig. 7b. The wave packet 2 corresponds to an arrival at $O$ overlapping $t_{II}$—this will control the phase $\phi$ of $Si$ (by the phase $a$ of $Si'$) as discussed above. The wave packets 1 and 3, 4, 5 correspond to arrivals a $O$ at other times—these have no relevant effects.

(1.7.2) Let me assume, accordingly, that the system of Fig. 5 is thus controlled along the lines of the scheme of Fig. 7. Then it possesses the following salient characteristics.

(a) The power level of the signal output $Si$, i. e. its culmination amplitude $r_{max}$, has no energy relation to the power level of the signal input $Si'$, i. e. its relevant amplitude $p$. Specifically, the former can be much larger than the latter. Indeed $r_{max}$ is controlled by $s_{max}$ (according to Fig. 3), while $p$ need only be reliably above noise level. Hence this system is an amplifier in the relationship of $Si'$ to $Si$, while $Ps$ acts as a power supply.

(b) The amplifying character is further supported by the fact that the duration of the signal output $Si$ can be as long as desired (it culminates in the entire time interval from $t_{III}$ to $t_{IV}$, cf. Fig. 7c), while the duration of the signal input $Si'$ can be quite short (it need only overlap $t_{II}$ unambiguously and satisfy adiabasy, i. e. be long in terms of the frequency $\frac{1}{2}f_1$—cf. the wave packet 2 in Fig. 7b). Also, the two durations are not related to each other.

(c) The phase $a$ of $Si'$ determines the phase $\phi$ of $Si$. However, $\phi$ has 2 distinct, quantized, equidistant values (the neighbors are $\pi$ apart), and each one of these is selected by an entire $a$ interval, these $a$ intervals being all of the same length (namely $\pi$). (Cf. 1.6.4.) Hence this system is (again in the relationship of $Si'$ to $Si$) a toggle.

(d) The phase $\phi$ of $Si$, which has been selected by the phase $a$ of $Si'$ (cf. (c)), is held by the system from $t_{III}$ (actually from somewhere near $t_{II}$) until $t_{IV}$ (actually until somewhere near $t_V$). During this time interval (i. e. $t_{III}$ to $t_{IV}$) $Si'$ need no longer operate (cf. the wave packet 2 in Fig. 7b), and even other $Si'$ (with other phases $a$) may appear (cf. the wave packet 3 in Fig. 7b)—all of this is irrelevant. Hence this system is (again in the relationship of $Si'$ to $Si$) a memory. The item that it remembers is a 2-way alternative. This is put in by $a$, in terms of the 2 distinct values $\bar{a}, \bar{a}+\pi$, each one of these actually representing the phase interval of length $\pi$ that is centered on it. It is put out by $\phi$ in terms of the 2 distinct values $\bar{\phi}, \bar{\phi}+\pi$, each one of these being precise and quantized.

(2.1.1) The properties of the system of Fig. 5 (controlled along the lines of Fig. 7) having been established (cf. $(a)$—$(d)$ in 1.7.2), the next task is that of organizing, according to preformulated logical plans, command-and-compliance relationships within aggregates of such systems.

I begin by considering an aggregate consisting of two such systems. These two systems are shown in Fig. 8. The designations in that figure are the same ones as those in Fig. 5, except that all those relating to the first system carry an index 1, and all those relating to the second system carry an index 2. The separating line $|$ is meant to indicate that the actual positioning of these two systems is left free. The arrows $\leftrightarrows$ crossing the line $|$ $$\left(\text{between } \begin{matrix}C_1\\D_1\end{matrix} \text{ and } \begin{matrix}A_2\\B_2\end{matrix}\right)$$

are meant to indicate that the channels $$\begin{matrix}A_1C_1\\B_1D_1\end{matrix} \text{ and } \begin{matrix}A_2C_2\\B_2D_2\end{matrix}$$

are connected $$\left(\text{from } \begin{matrix}C_1\\D_1\end{matrix} \text{ to } \begin{matrix}A_2\\B_2\end{matrix}\right)$$

The effect of this connection is that the signal output $Si_1$ of $O_1$ can act as a signal input $Si'_2$ of $O_2$. Of course, the reverse is equally possible, i. e. the signal output $Si_2$ of $O_2$ might act as a signal input $Si'_1$ of $O_1$. It is true that in Fig. 8 no $Si'_1$ coming from the $$\begin{matrix} C_1 \\ D_1 \end{matrix}$$

end is shown, but this is irrelevant. Indeed, the channel from $$\begin{matrix} C_1 \\ D_1 \end{matrix} \text{ to } \begin{matrix} A_2 \\ B_2 \end{matrix}$$

whatever its structure, must be just as passable from $$\begin{matrix} A_2 \\ B_2 \end{matrix} \text{ to } \begin{matrix} C_1 \\ D_1 \end{matrix}$$

as it is from $$\begin{matrix} C_1 \\ D_1 \end{matrix} \text{ to } \begin{matrix} A_2 \\ B_2 \end{matrix}$$

(2.1.2) It is now necessary to reexamine the arrangements of Fig. 7 in their application to the two systems in Fig. 8.

Let $s_1$, $s_2$ be the amplitudes of the stimuli $Ps_1$, $Ps_2$, respectively. I assume that their variations with time are represented by Figs. 9a, 9b, respectively. The time scale of these changes is again assumed to be adiabatic, i. e. slow compared to wave motions of the frequency $f_1$ and even $\frac{1}{2}f_1$ (cf. the discussion of Fig. 7). Of course, Fig. 9a represents the $Ps_1$ wave at $O_1$, and Fig. 9b represents the $Ps_2$ wave at $O_2$.

Remembering the conclusions reached at the end of 1.7.1., I can now state the following. The signal input $Si'_1$ that controls $O_1$ must overlap the time $t'$—this is the time when $s_1$ crosses $s_{crit}$ (increasing), corresponding to the $t_{II}$ of Fig. 7a. Similarly the signal input $Si'_2$ that controls $O_2$, must overlap the time $t''$—this is the time when $s_2$ crosses $s_{crit}$ (increasing), corresponding to the $t_{II}$ of Fig. 7a. The signal output $Si_1$ of $O_1$ exists during the time interval from $t'$ to $t'''$, and culminates within that interval in the area marked . . . (cf. Fig. 9a)—this overlaps $t''$, even the culmination area . . . does. On the other hand, the signal output $Si_2$ of $O_2$ exists during the time interval from $t''$ to $t''''$, and culminates within that interval in the area marked . . . (cf. Fig. 9b)—none of this overlaps $t'$.

Combining these statements, it follows, that the signal output $Si_1$ of $O_1$ is effective as signal input $Si''_2$ of $O_2$, while the signal output $Si_2$ of $O_2$ is not effective as signal input $Si'_1$ of $O_1$. In other words, $O_1$ controls $O_2$ through the wave propagation $Si_1 \rightarrow Si'_2$, but $O_2$ does not control $O_1$ through the wave propagation $Si_2 \rightarrow Si'_1$.

(2.1.3) This asymmetry deserves further comment.

As pointed out at the end of 2.1.1. the channel from $$\begin{matrix} C_1 \\ D_1 \end{matrix} \text{ to } \begin{matrix} A_2 \\ B_2 \end{matrix}$$

is unavoidably symmetric with respect to its propagation properties. Nevertheless, $O_1$ can control $O_2$, but $O_2$ cannot control $O_1$—thus justifying the unsymmetric indications in Fig. 8, where $Si''_2$ entered $$\begin{matrix} A_2C_2 \\ B_2D_2 \end{matrix}$$

coming from $$\begin{matrix} A_2 \\ B_2 \end{matrix}$$

but no corresponding $Si'_1$ entered $$\begin{matrix} A_1C_1 \\ B_1D_1 \end{matrix}$$

coming from $$\begin{matrix} C_1 \\ D_1 \end{matrix}$$

This asymmetry is entirely due to the timing of $Ps_1$ and $Ps_2$, i. e. to the arrangements of Fig. 9. Indeed, it is the asymmetry in the relative phasing of Fig. 9a (the $s_1$ curve) vs. Fig. 9b (the $s_2$ curve), which caused the asymmetry in the command-and-compliance relationship between $s_1$ and $s_2$ in Fig. 8. This shows that the logical interrelatedness between several organs can be controlled by the timing of their respective stimulating power supplies $Ps$. This principle will be exploited further in 2.2.3.—2.2.5.

The foregoing discussion covers the arrangement in which $n=2$. The more general statement of the conditions of use of the organ in the sense of 1.4.1. and 1.4.4. is $$\frac{1}{n}f_1 \approx f_0 \quad (1)$$

for an $n=1, 2, 3 \ldots$

For the crystal diodes referred to above $f_0$ may be 1,000–10,000 megacycles per second, and since $n$ is not likely to be larger than, say 3, $f_1$ will presumably be 1,000–30,000 megacycles per second. Hence the wave power in question will be shortwave power in the 30–1 cm. range, preferably near the shorter wave end of this range.

For other possible electrical embodiments the frequencies $f_1$, $f_0$ may be lower. Thus for a saturable magnetic device (possibly, but not necessarily ferromagnetic), which possesses a non-linear inductance, they will usually be a few megacycles per second only. I. e., in such cases the wave power in question will consist of ordinary electromagnetic oscillations in the megacycle range.

For a general $n$ $(=2, 3 \ldots)$ there will be similarly $n$ possible phases for the response, giving $n$ different responses $Si$. These phases are $$\bar{\phi}, \bar{\phi}+\frac{2\pi}{n}, \bar{\phi}+4\pi, \ldots, \bar{\phi}+\frac{2(n-1)\pi}{n}$$

When $n=2, 3 \ldots$, I will say that O is being used in near-subharmonic response, or, briefly, in subharmonic response. In these cases $n$ is the order of the subharmonic involved. The main applications among all of these seem to be $n=2, 3$, and quite particularly $n=2$.

I assume now that the subharmonic response case holds, i. e. that $n=2, 3 \ldots$ . This means, of course, that $f_0$ being given by the physical properties of O (e. g. of the crystal diode), I choose $f_1$, the frequency of the power supply, so that (1) above holds with this $n$, i. e., that $$\frac{f_1}{f_0}$$

is near this integer $n$.

Under these assumptions the basic arrangement for O is shown in Fig. 2. This figure is drawn as if O were a crystal diode, but it is actually the scheme for all applications of the underlying principle, as stated in 1.1. and 1.3.

The two channels $$\begin{matrix} AC \\ BD \end{matrix} \text{ and } \begin{matrix} EG \\ FH \end{matrix}$$

fulfill these purposes:

$$\begin{matrix} EG \\ FH \end{matrix}$$

conducts the power supply (frequency $f_1$) wave power to O.

$$\begin{matrix} AC \\ BD \end{matrix}$$

conducts the signal $$\left(\text{frequency } \frac{1}{n}f_1\right)$$

wave power from (and, as stated in 1.6.2., also to) O. Hence $$\begin{matrix} EF \\ GH \end{matrix}$$

should be so proportioned as to pass freely, or, at least, attenuate only slightly, waves of frequency $f_1$, while it should cut off, i. e. attenuate as much as possible, waves of frequency $$\frac{1}{n} f_1$$

Furthermore, for

AC
BD the reverse should be true. By the nature of things, O must be electromagnetically linked to both channels $$\frac{AC}{BD} \text{ and } \frac{EG}{FH}$$

in any well known manner.

The specific form of the electromagnetic device possessing both capacitance and inductance, one of these two reactances being non-linear, with which I have particularly dealt above, is a crystal diode. It is to be understood however that other solid state implementations are furnished by substances whose dielectric constant or magnetic permeability depend on the electromagnetic field, thus providing for non-linear capacitances or inductances. Ferroelectric and ferromagnetic substances are, in view of their saturation properties, extreme examples of this.

Non-linear capacitances and inductances can be obtained by using substances whose dielectric constant or magnetic permeability, respectively, depends on the local (electromagnetic) field strength. These traits are usually characterized by saturation, and possibly also associated with hysteresis phenomena. Ferroelectricity and ferromagnetism are extreme instances.

Non-linear capacitance is also present in certain forms of semiconductors, and especially in the case of a crystal diode.

(2.1.4) Before reverting to the discussion of the special case in which $n=2$ I want to say somewhat more about two particular aspects of the two system ($O_1$, $O_2$) aggregate of Fig. 8. The first remark refers to the signal input $Si'_1$ of $O_1$. This cannot come from the signal output $Si_2$ of $O_2$ (cf. the conclusion of 2.1.2.)—hence it must come from somewhere else. Its source is presumably another organ O—say $O_3$. I e. $Si'_1$ comes from the signal output $Si_3$ of this $O_3$. No matter where it comes from, however, it can propagate past $O_1$, to $$\begin{matrix} C_1 \\ D_1 \end{matrix}$$

thence to $$\begin{matrix} A_2 \\ B_2 \end{matrix}$$

and so to $O_2$—just like the $Si_1$—$Si'_2$ pair. Why does it then not exercise an additional—and unwanted—control of $O_2$? Actually this question does not arise in its worst possible form for $O_3$—i. e. $Si_3$—itself. Indeed $Si_3$ has a good chance to reach $O_2$ at the wrong time to be effective. Since it causes $Si'_1$, it must overlap $t'$ (cf. Fig. 9a), to be effective at $O_2$ it would have to overlap $t''$ (cf. Fig. 9b). There is no cogent reason for such a long duration of this signal, although such a length is not at all excluded (cf. the time intervals of culmination, marked — — — , in Fig. 9a–9b). However, just as the signal input $Si'_2$ of $O_2$ came from the signal output $Si_1$ of $O_1$, and as the signal input $Si'_1$ at $O_1$ was assumed to be coming from the signal output $Si_3$ of an $O_3$, similarly $O_3$ needs a $Si'_3$ which comes probably from the $Si_4$ of an $O_4$, also $O_4$ needs a $Si'_4$ which comes probably from the $Si_5$ of an $O_5$, etc. Now one must expect, that in this sequence $O_3$, $O_4$, $O_5$, . . . , there will be one or more organs O, whose signal output $Si$ reaches $O_2$ at the right time for effective control—i. e. overlapping $t''$. At this point the above question arises unambiguously, and must be answered as such.

The answer is this. The $Si$ in question, if it overlaps $t''$, is not at that moment the only one to try to control $O_2$—indeed, it is competing with $Si_1$. I. e. these two, by superposition, form the signal input $Si'_2$ of $O_2$. According to 1.6.3., the $Si_1$ wave's contribution to $Si'_2$ at $O_2$ is $$p_1 \cos\left(\frac{1}{n}t' - \bar{a}_1\right) \text{—amplitude } p_1, \text{ phase } a_1$$

Similarly, the $Si$ wave's contribution to $Si'_2$ at $O_2$ is $$p \cos\left(\frac{1}{n}t' - a\right) \text{—amplitude } p, \text{ phase } a$$

The total $Si'_2$ is therefore $$p^* \cos\left(\frac{1}{n}t' - a^*\right) \equiv p_1 \cos\left(\frac{1}{n}t' - \bar{a}_1\right) +$$

$$p \cos\left(\frac{1}{n}t' - a\right) \text{—amplitude } p^*, \text{ phases } a^*$$

Now it is clear that if $p \ll p_1$ (no matter what $a$ is), then $p^*$ differs only slightly from $p_1$, and $a^*$ differs only slightly from $a_1$. Hence the command function of $Si_1$ exercised over $O_2$ is only slightly impaired. Indeed because of the quantized dependence of $\phi$ on $a$ (cf. e. g. 1.7.2. (c)), this command function will be absolutely unaffected, as long as $a$ is kept reasonably close to the center of each $a$ interval (cf. 1.7.2. (c)).

Thus all that is needed is this. At $O_2$ the signal $Si_1$ must have a substantially greater amplitude than the signal $Si$. Now $Si_1$ comes from the immediate neighbor $O_1$ of $O_2$, while $Si$ comes from a remoter source O. Hence all that is needed is a moderate amount of attenuation in the process of conducting these signals. In the terminology of Fig. 5 this means that the channel $$\frac{AC}{BD}$$

must have some attenuation even for the waves that it is its function to propagate, i. e. for the signals $$Si, Si' \left(\text{frequency } \frac{1}{n} f_1\right)$$

Of course, this attenuation must not be excessive.

(2.1.5) The second remark deals with the manner in which the signal output $Si_1$ of $O_1$ goes over into the signal input $Si'_2$ of $O_2$ (cf. again Fig. 8). $Si_1$ has at $O_1$ $n$ possible phases $$\phi = \bar{\phi}, \bar{\phi} + \frac{2\pi}{n}, \bar{\phi} + \frac{4\pi}{n}, \ldots, \bar{\phi} + \frac{2(n-1)\pi}{n}$$

At its arrival at $O_2$ it is $Si'_2$, and in order to exercise its command function there, it must have the phases $$a = \bar{a}, \bar{a} + \frac{2\pi}{n}, \bar{a} + \frac{4\pi}{n}, \ldots, \bar{a} + \frac{2(n-1)\pi}{n}$$

in some suitable correspondence to the foregoing—or at any rate be close to these. Note that the maximum allowable distance from these (central) $a$ values is $$\frac{\pi}{n}$$

(cf. 1.7.2. (c)), but actually, the smaller this distance, the better (cf. the end of 2.1.4.). Hence it is best to try to keep $a$ quite closely to the above values. This $a$ will, then, cause $O_2$ to generate a $$\phi \text{ with } \phi = \bar{\phi}, \bar{\phi} + \frac{2\pi}{n}, \bar{\phi} + \frac{4\pi}{n}, \ldots, \bar{\phi} + \frac{2(n-1)\pi}{n}$$

respectively.

If an O emits a signal $Si$ with the phase $$\phi = \bar{\phi}, \bar{\phi} + \frac{2\pi}{n}, \bar{\phi} + \frac{4\pi}{n}, \ldots, \bar{\phi} + \frac{2(n-1)\pi}{n}$$

I will say that it emits order No. 0, 1, 2, . . . , $n-1$, respectively. Since a change of the phase $\phi$ by an integer multiple of $2\pi$ is irrelevant, a change of the order No. by an integer multiple of $n$ is irrelevant. (I. e. orders Nos. $-1$, $n-1$, $2n-1$, $3n-1$ are the same, orders Nos.

—$n$, 0, $n$, $2n$ are the same, orders Nos. $-n+1$, 1, $n+1$, $2n+1$ are the same, etc.)

Hence, if the transit from $O_1$ to $O_2$ shifts the phase of the signal by $\bar{a}-\bar{\phi}$, then $\bar{\phi}$ (for $Si_1$) goes over into $$\bar{a} \text{ (for } Si'_2), \phi+\frac{2\pi}{n} \text{ (for } Si_1)$$

goes over into $$\bar{a}+\frac{2\pi}{n} \text{ for } Si'_2), \bar{\phi}+\frac{4\pi}{n} \text{ (for } Si_1)$$

goes over into $$\bar{a}+\frac{4\pi}{n} \text{ (for } Si'_2), \ldots, \bar{\phi}+\frac{2(n-1)\pi}{n} \text{ (for } Si_1)$$

goes over into $$\bar{a}+\frac{2(n-1)\pi}{n} \text{ (for } Si'_2)$$

I. e. the orders Nos. 0, 1, 2, ..., $n-1$ issuing from $O_1$ induce at $O_2$ the orders Nos. 0, 1, 2, ..., $n-1$, respectively. It is also clear that if the phase shift from $$O_1 \text{ to } O_2 \text{ is } \bar{a}-\bar{\phi}+\frac{2\pi}{n}$$

then $$\phi=\bar{\phi}, \bar{\phi}+\frac{2\pi}{n}, \bar{\phi}+\frac{4\pi}{n}, \ldots, \bar{\phi}+\frac{2(n-1)\pi}{n}$$

go over into $$\bar{\phi}+\frac{2\pi}{n}, \bar{\phi}+\frac{4\pi}{n}, \bar{\phi}+\frac{6\pi}{n}, \ldots, \bar{\phi}+\frac{2n\pi}{n}$$

(the last phase is, of course, the same as $\bar{\phi}$). I. e. the orders Nos. 0, 1, 2, ..., $n-1$ issuing from $O_1$ induce at $O_2$ the orders Nos. 1, 2, 3, ..., $n$ (the last No. is, of course, the same as 0).

More generally: If the phase shift from $O_1$ to $$O_2 \text{ is } \bar{a}-\bar{\phi}+\frac{2\pi k}{n} \ (k=0, 1, 2, \ldots)$$

then an order No. $i$ ($=0, 1, 2, \ldots, n-1$) issuing from $O_1$ will induce at $O_2$ the order No. $i+k$.

Note, that all these required phase changes $$\bar{a}-\bar{\phi}+\frac{2\pi k}{n}$$

are likely to be of the same order of magnitude as $2\pi$. Hence they correspond to delays of the same order of duration as the period of the signal wave $$\left(\text{frequency }\frac{1}{n}f_1\right)$$

and (unless other delaying arrangements are used) necessitating effective distances between $O_1$ and $O_2$ of the same order as the wave length of the signal wave.

Combining this with what I said in 1.7.1. and at the beginning of 2.1.2. about adiabasy, the above delays are seen to be short in comparison with the durations that are relevant in the arrangements of Figs. 6 and 9. Hence the timing requirements that are inherent in these arrangements are not disturbed by the delays in question. For the crystal diode case, with the quantitative values of 1.4.2., the above delays will be of the order of $10^{-9}$—$10^{-10}$ seconds, and the corresponding distances of the order of 30-3 cm. The shorter wave end of this range allows, of course, a very convenient direct handling of these delays.

(2.2.1) The discussions of 2.1. have characterized the functioning of a two system aggregate to a sufficient extent so that I can now proceed to the consideration of more extensive aggregates. (Cf. the beginning of 2.1.1.) Such a "more extensive aggregate" will consist of a larger number of organs O—say $O_1$, $O_2$, $O_3$, .... Each one of these is in a setup like that of Fig. 5, and each two that communicate (i. e. are in a command-and-compliance relationship) are in a setup like that of Fig. 8.

(2.2.2) Let me now discuss the structure of this aggregate as a whole. It is desirable to have a somewhat simpler schematic representation for the constituent parts of the aggregate. I will achieve this in the following way. Where a single organ O is present, I will not draw the—already schematized, but nevertheless quite complex—entire scheme of Fig. 5, but only a rectangle with two lines attached, to indicate the signal channel $$\left(\begin{matrix}AC\\BD\end{matrix}\text{ of Fig. 5}\right)$$

This is shown in Fig. 10a. Note that the signal channel is not directed, in particular no input and no output side is indicated. This is in conformity with the remarks at the end of 2.1.1. and at the beginning of 2.1.3. Note, also, that the power supply channel $$\left(\begin{matrix}EG\\FH\end{matrix}\text{ of Fig. 5}\right)$$

is not shown at all—indeed, the further discussions will never require showing it.

Where two organs $O_1$, $O_2$ are communicating (through their signal channels, cf. Fig. 8) I will not draw the—already schematized, but nevertheless quite complex—entire scheme of Fig. 8, but only connect the signal channels of the two rectangles that represent $O_1$, $O_2$. This is shown in Fig. 10b. A more composite aggregate of several organs O, in which some pairs are connected, and others are not, is shown in Fig. 10c.

(2.2.3) The notations of 2.2.2., i. e. of Fig. 10, are obviously incomplete in that they do not indicate the timing of the power supply to the various organs O. Indeed, the functioning of the two system aggregate of Fig. 8 is entirely controlled by the concurrent timing arrangements shown in Fig. 9. Without this the hierarchy of command in Fig. 8—i. e. in its equivalent Fig. 10b—is quite indefinite. It is therefore necessary to introduce some broader counterpart of the timing arrangements of Fig. 9 into the scheme of Fig. 10—in particular into the general case to which Fig. 10c refers.

The timing arrangements of Fig. 9 furnish the prototype for what is needed here. However, since these systems will have to function repetitiously over long periods of time, it will be necessary to repeat cyclically the process shown in Fig. 9. I. e., the entire process shown in Fig. 9 has to be viewed as an elementary period, which is immediately repeated as soon as it is completed. This repetitious arrangement of Fig. 9—i. e. of its parts 9a and 9b—is shown in Fig. 11a—11b. Here two complete elementary periods are shown—from 0 to 1 and from 1 to 2. Each one of these elementary periods reproduces the entire Fig. 9. Of the time markers $t'$, $t''$, $t'''$, $t''''$ of Fig. 9 only $t'$, $t''$ are shown, and these are now designated $t_a$, $t_b$. $s_1$, $s_2$ are designated $s_a$, $s_b$. The appearance of the basic "$s$ wave" of Fig. 9 is somewhat distorted—but not in any decisive way.

As in Fig. 9 so in Fig. 11 $(a)$ controls $(b)$, because the culmination period of $(a)$ overlaps the critical moment $t_b$ of $(b)$ but $(b)$ does not control $(a)$, because the culmination period of $(b)$ does not overlap the critical moment $t_a$ of $(a)$. (Cf. the corresponding discussion in 2.1.2.—2.1.3.) If one tried to control $(b)$ by $(b)$, the signal input at the critical time $t_b$ of $(b)$ would be quite weak, since this is just when $(b)$ begins to produce a signal output. This would be completely overridden by the much stronger signal output of any $(a)$ that happens to be connected, as the discussion at the end of 2.1.4. shows, which clearly applies here. Hence $(b)$ does not control $(b)$, at least not when an $(a)$ is also connected.

(2.2.4) The $(a)$—$(b)$ scheme of 2.2.3. is all right as far as it goes but it is still quite inadequate in one respect. The reason is, that there is no indirect mechanism by which $(b)$ can control $(a)$. This makes the organization of a complex control system impossible. Any direct control of $(a)$ by $(b)$ had, of course, to be excluded—if (a) and (b) controlled each other mutually, no hierarchy, i. e. no organization of control, would have been possible. It is therefore necessary to introduce at least one more category of timing ararngements. I will describe here only the simplest possible scheme that is adequate. This implies only one additional timing arrangement. This is shown in Fig. 11c.

The relationship of (a), (b), (c) to each other possesses perfect cyclical symmetry. Hence (b) controls (c), while (c) does not control (b), nor does (c) control (c), at least not when a (b) is also connected. Also (c) controls (a), while (a) does not control (c), nor does (a) control (a), at least not when a (c) is also connected. Inspection of Fig. 11 also shows that each control is exercised from any culmination period of the controlling organ to the immediately following—and partialy overlapping—culmination period of the controlled organ.

I will designate an organ O that has the timing cycle (a) or (b) or (c), by writing an A or B or C, respectively, into its rectangle in the scheme of Fig. 10a. This is shown in Fig. 12a. The equivalent of Fig. 8 in combination with Fig. 9 is now shown in Fig. 12b.

I want to emphasize that this scheme, with precisely three timing arrangements (a), (b), (c), which in addition obtain from each other by simple shifts of the "$s$ wave" in its period (cf. Fig. 11), and corresponding to the three classes A, B, C of organs O, is merely one of many possible ones. It is, however, the simplest one. One could have more than three timing arrangements (i. e. classes of organs O), one could forego the complete cyclical (i. e. "$s$ wave" shift) symmetry, etc. Various viewpoints and preferences with respect to these things are possible. However, the above simple scheme is at any rate adequate for organizing any hierarchical system of command-and-compliance relationships—i. e. for all logical and mathematical purposes. I will therefore, in what follows, limit myself to considerations based on this scheme.

(2.2.5) According to 2.2.4. this is true: A can be controlled by C, but not (in preference to C) by A or B; B can be controlled by A, but not (in preference to A) by B or C; C can be controlled by B, but not (in preference to B) by A or B.

Inserting a delay that is equivalent to ⅓ of the period in Figure 11 (i. e. of the duration from 0 to 1) clearly replaces in Figure 11, with respect to the control function, each "$s$ wave" by one that is as much ahead of it in phase. I. e. (a) by (c), (b) by (a), (c) by (b). Hence now A is preferentially controlled by B, B is preferentially controlled by C, and C is preferentially controlled by A. I will designate such a delay by writing a ① over the line that connects two organs O. This permits a variant for Figure 12b, where, e. g., a B controls an A, as shown in Figure 13.

Note, that in comparing Figure 12b with Figure 13, the right-left transposition is irrelevant, the only thing that matters is, that the absence or presence of the ① determines whether A controls B or conversely.

(2.2.6) The schematic designations of 2.2.2—2.2.5. leave one last feature unaccounted for. I discussed in 2.1.5. how the controlling organ's order No. determined the controlled organ's order No. I showed in particular, how the latter No. could be made to be equal to the former order No. plus $k$ (cyclically in the system of order Nos. 0, 1, 2, ..., $n-1$)—with any given (but presumably moderate) $k=0, 1, 2, \ldots$ (Actually, I will only use $k=0, 1$, cf. 3.1.1.). This required a suitable delay on the connecting path, which is very short compared to the time scale of Figures 6 and 9, i. e. of Figure 11. Hence this does not interfere with the delay adjustments of 2.2.5. I will indicate this $k$ by writing it under the line that connects two organs O, always suppressing the indications of $k=0$. Hence Figures 12b and 13 imply $k=0$, while a 1 under their connecting line would indicate $k=1$.

(2.2.7) One more thing that should be said in the present context is this. The discussions of 2.2.4.—2.2.6. furnish criteria for the control of an organ O by a single (effective) organ O. However it can occur, that several organs O, each of which is able to exercise effective control (i. e. belongs to the appropriate class) are connected to the controlled organ O. This would be the case in Figure 10c, if its rectangles were marked with appropriate A, B, C—e. g. A for the two leftmost rectangles, and B for the middle rectangle in the upper line. It is therefore necessary to discuss these forms of multiple control, the more so, because several basic logical operations (like the conjunction and the disjunction) express multiple control.

(3.1.1) At this point I will again limit myself to $n=2$. In spite of the interest of $n=3, 4, \ldots$, and in particular of $n=3$ (cf. 1.4.3.), the case $n=2$ is sufficiently important, to be discussed as a typifying special case. For $n=2$ it is preferable to give the orders Nos. 0, 1, as defined in 2.1.5., other names. I will call order No. 0 positive and order No. 1 negative. For $k=0$ (cf. 2.1.5., also 2.2.6) No. 0 commands No. 0 and No. 1 commands No. 1—i. e. positive commands positive and negative commands negative. This is an affirmative connection. For $k=1$ (cf. eod.) No. 0 commands No. 1 and No. 1 commands No. 0—i. e. positive commands negative and negative commands positive. This is a negative connection. This suggests changing the designations introduced in 2.2.6. I will still make no indication for an affirmative connection ($k=0$), but I will write an $n$ (instead of a 1) under the line to indicate a negative connection ($k=1$).

Note, that the affirmative connection expresses the absence of any logical processing, while the negative connection expresses the logical operation "no."

(3.1.2) I will now consider the operation of multiple control, to which I have already referred in 2.2.7. This means discussing the behavior of an organ O, to which several other organs O are connected, each of which is able to exercise effective control over it. In the example mentioned in 2.2.7. an O has two such connections. However, it is preferable to discuss now a case with three such connections, as shown in Figure 14. The question, then, is this: If the three A issue a given combination of positive and negative orders, what will B do?

Let the three A organs be $O_{11}$, $O_{12}$, $O_{13}$, with the signal outputs $Si_{11}$, $Si_{12}$, $Si_{13}$, respectively, and let the B organ be $O_2$, with the signal input $Si'_2$. Let the contributions of $Si_{11}$, $Si_{12}$, $Si_{13}$ to $Si'_2$ at $O_2$ have the amplitudes $p_{11}$, $p_{12}$, $p_{13}$, respectively and the phases $a_{11}$, $a_{12}$, $a_{13}$, respectively. I. e. these contributions are $$p_{11} \cos\left(\frac{1}{2}t' - a_{11}\right), \; p_{12} \cos\left(\frac{1}{2}t' - a_{12}\right), \; p_{13} \cos\left(\frac{1}{2}t' - a_{13}\right)$$

Obviously $Si'_2$ at $O_2$ will be the sum of these three terms, i. e.

(2) $$p_{11} \cos\left(\frac{1}{2}t' - a_{11}\right) + p_{12} \cos\left(\frac{1}{2}t' - a_{12}\right) + p_{13} \cos\left(\frac{1}{2}t' - a_{13}\right)$$

Now the system should be so adjusted, that all three signals $Si_{11}$, $Si_{12}$, $Si_{13}$ contribute approximately the same amplitude at $O_2$—i. e. approximately $p_{11}=p_{12}=p_{13}$. Let $p$ be this common value. Also, the $a_{11}$, $a_{12}$, $a_{13}$ are to be adjusted as usual, i. e. each one is either $\bar{a}$ (positive order) or $$\bar{a} + \pi$$

(negative order). (For this, cf. 2.1.5. and 3.1.1.)

Clearly, every term with $$a_{1h} = \bar{a}$$

in (2) contributes to this expression the same, standard, term $$p \cos\left(\frac{1}{2}t' - \bar{a}\right)$$

Similarly, every term with $$a_{1h} = \bar{a} + \pi$$

contributes the opposite equal term $$-p \cos\left(\frac{1}{2}t' - \bar{a}\right)$$

(The relationship of these two terms is the same as that shown—in a somewhat different context—in Figures 4b, c. Hence the sum is $$3p \cos\left(\frac{1}{2}t' - \bar{a}\right)$$

if all three $$a_{1h} \text{ are } = \bar{a}$$

it is $$p \cos\left(\frac{1}{2}t' - \bar{a}\right)$$

if two are $=\bar{a}$ and one is $=\bar{a}+\pi$, it is $$-p \cos\left(\frac{1}{2}t' - \bar{a}\right) = p \cos\left(\frac{1}{2}t' - (\bar{a}+\pi)\right)$$

if one is $$=\bar{a} \text{ and two are} = \bar{a}+\pi$$

and it is $$-3p \cos\left(\frac{1}{2}t' - \bar{a}\right) = 3p \cos\left(\frac{1}{2}t' - (\bar{a}+\pi)\right)$$

if all three are $=\bar{a}+\pi$. Hence, if two or three of the $a_{11}, a_{12}, a_{13} = \bar{a}$, i. e. if the majority of the $S_{11}, S_{12}, S_{13}$ is positive, then $$Si'_2 \text{ is } p \cos\left(\frac{1}{2}t' - \bar{a}\right)$$

or $$3p \cos\left(\frac{1}{2}t' - \bar{a}\right)$$

thus its phase is $\bar{a}$, i. e. it is a positive order. Further, if two or three of the $$a_{11}, a_{12}, a_{13} \text{ are } = \bar{a}+\pi$$

i. e. if the majority of the $S_{11}, S_{12}, S_{13}$ is negative, then $$Si'_2 \text{ is } -p \cos\left(\frac{1}{2}t' - \bar{a}\right) \text{ or } -3p \cos\left(\frac{1}{2}t' - \bar{a}\right)$$

thus its phase is $$\bar{a}+\pi$$

(cf. the remarks made above on the change of sign), i. e. it is a negative order.

To summarize. Under the conditions of Figure 14—i. e. with the contributions of the three A to the signal input of B at approximately equal amplitudes, and the phases adjusted as usual (cf. 2.1.5. and 3.1.1.), the order induced in B will agree with the majority of the three orders issuing from the A. I. e., in this set up the aggregate of Figure 14 performs the logical function of sensing a majority (of three). I will therefore call this a majority organ.

(3.1.3) The majority organ of 3.1.2., together with the possibility of a negation (because of the existence of positive and of negative connections, cf. the end of 3.1.1.) suffice to build up all logical operations. Later on (in 3.3.) I will give examples of how this is done in various typical cases. However, there still remain some questions in the area under consideration here, and it is preferable to discuss these first.

(3.1.4) First a remark about multiple control. The discussion of such control in 3.1.2. dealt with the case of three inputs (cf. Figure 14). There is no reason, however, why one should limit oneself to this particular number. In considering other numbers of inputs, this should be said. An even number of inputs has the disadvantage that there may be no majority, i. e. equal numbers of positive and negative orders. In this case the expression that corresponds to the right hand side of (2) in 3.1.2. will be (approximately) zero—i. e. the inputs in question do not produce a signal input with a stable phase. Hence in this case the behavior of the controlled organ is not unambiguously predictable. In view of this, primarily odd numbers of inputs should be considered. Since one is not multiple and three has been taken care of in 3.1.2., the next case to be considered is that of five inputs. Thus the majority organ of 3.1.2. can be considered in a sequence of forms, among which the 3 input and the 5 input ones are the simplest and the stablest ones.

(3.1.5) In the discussions up to now there was a strong presumption that the signal input $Si'$ of any $O$ is likely to come from the signal output $Si$ of some other $O$. (Cf. in particular a remark at the beginning of 2.1.4.) I want to point out that this will not always be so. Indeed, it cannot be so, without any exceptions, since the signals connected with the various $O$ of an aggregate cannot purely keep generating each other, but must at some original occasion, or occasions, be produced somewhere outside it. Actually, the more detailed examples of 3.3. will show that these "original occasions" have to be quite numerous, and keep reoccurring during frequent instances in the course of all the logical organizations (i. e. aggregates of systems $O$) that will be dealt with.

These "original occasions," then, call for outside sources of signals. I. e. there must be sources of wave power of the signal type (frequency $\frac{1}{2}f_1$) which can feed signal inputs of organs $O$ wherever this is called for. These sources are best thought of as being continuously active. I. e. they must have constant amplitude. Thus they will be unlike the power supply sources, which furnish the wave power of the power supply type (frequency $f_1$), and which had varying amplitudes, as shown in the "$s$ wave" diagrams of Figure 11. (All these sources will be discussed in more detail in 3.2.2.—3.2.4.)

I will call such a constant amplitude source of wave power of the signal type a permanent source. Because of its constant amplitude it can exercise its control function over an organ $O$ to which it is connected at all times and for all classes (A, B, C) of these organs. In the diagrams of the type of Figures 12–14 I will designate a permanent source by a $p$. Figure 15 shows a (3 input) majority organ, one of whose inputs is a $p$, while the two others are as in Figure 14.

(3.2.1) The schematization that I have applied in describing aggregates of organs $O$ was useful in providing simple notations. However, after this is understood, it is indicated to comment briefly on some of those details of the actual objects involved, which have been suppressed in this schematization in the interest of simplicity.

(3.2.2) The notations in question, as shown in Figures 10, 12–15, do not show the $Ps$ channels, which appeared in Figures 5, 10

$$\left(\text{as } \frac{AC}{BD} \cdot \text{with or without indices}\right)$$

These channels provide the $Ps$ wave power, i. e. the energy on which the signal outputs are maintained. It is also this power, whose amplitude variations—as shown by the "$s$ waves" in Figure 11—endow the organs $O$ with their decisive classificatory property, i. e. make them belong to their assigned class A or B or C. It is therefore necessary to emphasize, that these channels must exist, and that each organ $O$ (i. e. each indicated rectangle in the figures representing the aggregates under consideration) must be attached to them. Furthermore, these channels must be so arranged, i. e. provided with such delays, that each organ $O$ receives its "$s$ wave" in the proper phase. I. e. this phase must produce the pattern shown in Figures 11a, b, c, if $O$ belongs to class A, B, C, respectively. At its origin (this may be at one or at more places), this $Ps$ channel system must be fed the basic "$s$ wave" type—say that of Figure 11a. (From this basic type, then, all the required types, according to Figures 11a, b, c, are derived by suitable delays, as indicated above.)

(3.2.3) In the case of a crystal diode, and *cm* wave power as P*s* wave power, this original source will be some suitable short wave generator—e. g. a magnetron or klystron, etc., of the appropriate frequency $f_1$. In the example heretofore given this frequency $f_1$ is 1,000–30,000 megacycles/second.

This output must then be amplitude modulated according to the (periodic) scheme of Figure 11*a* (cf. above). I noted in 1.7.1. and at the beginning of 2.1.2., that the relevant changes in the "*s* waves" of Figures 6, 9, and hence also of Figure 11, must be slow compared to wave motions of frequency $f_1$ and even $\frac{1}{2}f_1$. Let therefore, as an example, the ascending branch of the "*s* wave" in Figure 11*a* be equivalent to 5–10 periods of the frequency $\frac{1}{2}f_1$ wave, i. e. to 10–20 periods of the frequency $f_1$ wave. This makes the whole period of Figure 11*a* (from 0 to 1) equivalent to 30–60 periods of frequency $f_1$. I. e. the modulation frequency will be 30–60 times lower than $f_1$. I. e., in the above example, 17–1,000 megacycles. Of course, in order to achieve a wave form like that of Figure 11*a*, harmonics up to about the third or fifth will be needed. Hence in this typical arrangement an oscillator in the above frequency range must be provided, which controls the amplitude *s* of the basic short wave generator, with a characteristic "*s* wave" form according to Figure 11*a*.

(3.2.4) Next, I consider signal power. This is either generated by the organs O themselves, or by the permanent sources of 3.1.5. As discussed there, these sources generate with frequency $\frac{1}{2}f_1$ and constant amplitude.

In the crystal diode case, using the example according to 3.2.3., these permanent sources must be fed by some suitable short wave generator (magnetron or klystron, etc.) of $\frac{1}{2}$ the frequency of the original P*s* source of 3.2.3. Hence the frequency that is needed here is 500–15,000 megacycles/second. The second harmonic of this short wave generator must be locked to the P*s* source in question.

(3.2.5) Finally, I want to observe that the geometrical arrangements of Figures 10, 12–15 must not be taken literally. E. g. these show each rectangle, i. e. each organ O, with two signal channels, of which one is presumably input and one output. Also, in the case of multiple control (cf. in particular Figures 14, 15) several channels are seen merging, all of them being presumptive input channels. Similarly channels might be split, namely presumptive output channels. None of this should be taken literally. Any suitable arrangement of cavities and conductors is acceptable. Indeed, any devices, that produce the necessary delays or phase shifts, and the necessary electro-magnetic transmissions and linkages, will do.

(3.3) I am now returning to the considerations on general logical operations, which were last referred to in 3.1.3.

These are some basic logical operations and their implementation by aggregates of the type that I am discussing here.

(*a*) In Figure 15 B follows the majority of its inputs. One of them (the *p*) is always positive, hence a majority of positives exists if and only if at least one of the two A's is positive. I. e. B is positive if and only if at least one of the two A's is. Hence this expresses the logical operation "or," the disjunction.

Figure 16:
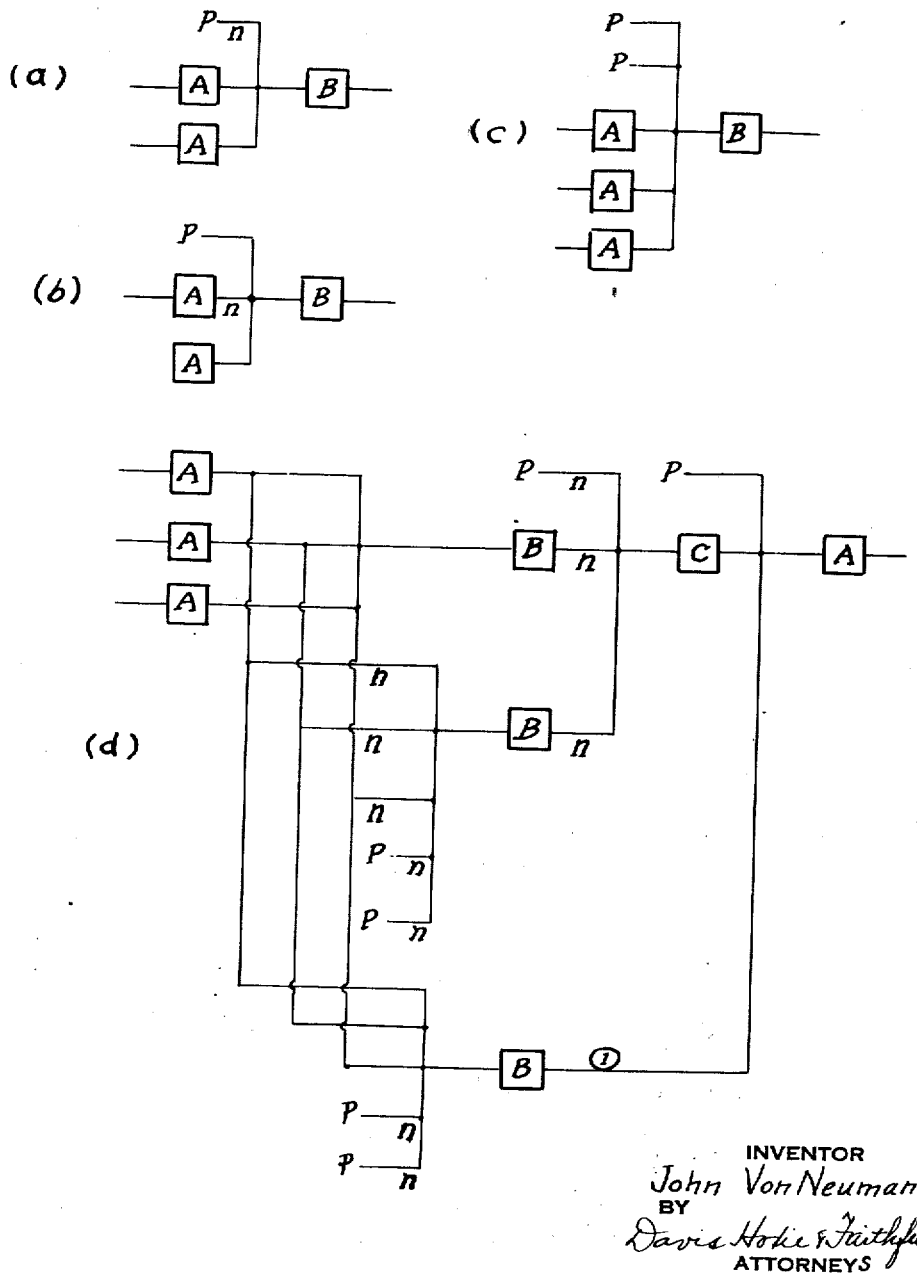
Fig. 16a is a diagrammatic view showing a conjunctive connection of several organs.
Fig. 16b is a diagrammatic view showing an implication connection of several organs.
Fig. 16c is a diagrammatic view showing an alternative conjunction connection of several organs.
Fig. 16d is a diagrammatic view showing a parity connection of several organs.

(*b*) In Figure 16.*a*, too, B follows the majority of its inputs. However, now one of them (the *p* followed by *n*) is always negative, hence a majority of positives exists if and only if both A are positive. I. e. B is positive if and only if both A are positive. Hence this expresses the logical operation "and," the conjunction.

(*c*) Figure 16.*b* differs from Figure 15 only in this, that the upper A connection has an *n*. I. e. (*a*) above implies that B is positive if and only if the upper A is negative or the lower A is positive (or both)—i. e. if and only if positivity of the upper A implies positivity of the lower A. Hence this expresses the logical operation of implication.

(*d*) Figure 16.*c* can be discussed along the lines of Figure 16.*a* in (*b*) above. B is positive if and only if all three A are positive. Hence this expresses again the logical operation "and," the conjunction (for three).

(*e*) Figure 16.*d* can be discussed as follows: The uppermost B is positive, if and only if $\geq 2$ of the A on the left are positive (cf. 3.1.2.). The middle B is positive, if and only if all the A on the left are negative (cf. (*d*) above). The lowest B is positive, if and only if all the A on the left are positive (cf. (*d*) above). The C is positive, if and only if the uppermost as well as the middle B is negative (cf. (*b*) above), i. e. if the number of positive ones among the A on the left is not $\geq 2$ and not 0, i. e. if it is 1. The A on the right is positive, if and only if either the C or the lowest B is positive (cf. (*a*) above), i. e. if the number of positive ones among the A on the left is either 1 or 3, i. e. if it is odd. Hence this aggregate senses parity.

(*f*) The majority organ (cf. 3.1.2.) and the parity organ (cf. (*e*) above) determine the carry digit and the sum digit in binary addition—the three inputs being the digits of the two addends, that correspond to the stage of addition that is being performed, and the carry digit from the immediately preceding stage of addition. Hence these two organs provide for the basic operation of binary arithmetic.

To conclude, I note, that in all aggregates of Figures 15., 16. the inputs come from organs O (of class A) which are also shown. Hence if such aggregates are put in series, the last (rightmost, output) organ of each aggregate may be merged with the appropriate one among the first (leftmost, input) organs O of its successor aggregate in the series.

(4.1.1) The wave power that has to be supplied to, or is induced within the aggregates discussed in 2., 3. is sufficiently peculiar in its properties, and in the requirements to which it is subject, that it deserves reconsideration at this point. In what follows the specializing assumption $n=2$, which was made in 3.1.1., and was valid throughout 3., is no longer needed. I will therefore allow from now on a general $n=2, 3, \ldots ,$. The main distinction among the forms of wave power that are required was, of course, all along that into the P*s* (i. e. power supply) and the S*i* (i. e. signal) type. I will consider these separately.

(4.1.2) The P*s* wave power was discussed in detail in 3.2.3. According to this, it has frequency $f_1$ and is amplitude modulated according to the "*s* wave" pattern, e. g. as shown in Figure 11*a*. This modulation had a fundamental of e. g. about 30–60 times lower frequency than $f_1$ and had to be reasonably well controlled as to its shape, implying control of its harmonics up to the third or fifth. The phase of these waves has to be controlled in two superposed ways.

First, the classification of the organs O, according to 2.2.4., of which the three classes A, B, C, discussed in 2.2.5., are a typical example, requires a system of delays. These have to produce the patterns of Figure 11*a*, *b*, *c* for these classes A, B, C of this example. Thus their precision requirements need only be such as to safeguard the distinctness and the relevant mutual interrelatedness of these patterns—i. e. they correspond to their relatively long period, i. e. their relatively low repetition frequency (e. g. 30–60 times lower than $f_1$, cf. above) according to Figure 11. In other words, this is phase control for the amplitude modulation, the "*s* wave."

Second, the phase *b* of the frequency $f_1$ oscillations in the P*s* waves has not been mentioned again since 1.5.5., but it is basic for everything that followed. Specifically, it furnishes the frame of reference for the phase $\phi$ on which the entire phase system of the S*i* waves was based. I. e. it is the fixed frame of reference for the order system as defined in 2.1.5. Consequently this phase $b$ has to be controlled. The precision requirements are now determined by the fact, that this phase control must be exercised with respect to the frequency $f_1$ of the $Ps$ waves. Hence it is considerably (in the above example 30–60 times) more stringent than the phase control mentioned under the first heading. It is nevertheless perfectly feasible, since the frequency $f_1$ corresponds to $cm$ waves.

Actually all these statements on phase control are incomplete since they do not specify the absolute reference point with respect to which they are to be effected. I will deal with this point in 4.1.4.

(4.1.3) The $Si$ wave power was discussed in 3.2.4. According to this, it has frequency $\frac{1}{2}f_1$—but since that is the special case $n=2$, the frequency is in the present general case $$\frac{1}{n}f_1$$

(Cf. also 1.4.4.). It can be of two kinds: It may originate in a permanent source (cf. also 3.1.5.) or in an organ O.

(4.1.4) The output of a permanent source has constant amplitude—i. e. it is a pure harmonic wave (of frequency $$\frac{1}{n}f_1$$

of course subharmonic to the frequency $f_1$). This requires, therefore, no special discussion. However, the phase must also be controlled. Indeed, according to 2.1.5., this phase must be—at the O whose control is to be effected or shared—$\bar{a}$ plus a suitable integer multiple of $$\frac{2\pi}{n}$$

This is, of course, defined relatively to the controlled phase $b$ of the $Ps$ source (cf. 4.1.2.). This "relative control" of the two phases $\bar{a}$ and $b$ calls for a somewhat more detailed discussion, which I will now give.

The $Ps$ wave source is the $n$-th harmonic of the $Si$ wave source (frequencies $$f_1 \text{ and } \frac{1}{n}f_1$$

respectively), and the two must be locked together so that this relationship is rigorously maintained. There is, of course, no difficulty in doing this. In view of this strict harmonic relationship the phase $b$ of the $Ps$ wave can be locked to the phase $\bar{a}$ of the $Si$ wave—so that the lower harmonic ($Si$ with $\bar{a}$) determines the higher harmonic ($Ps$ with $b$).

It is true, that if one started at the other end, i. e. with $b$, then $\bar{a}$ would only be defined to within an additive integer multiple of $$\frac{2\pi}{n}$$

It is, however, best to view the situation that arises from this locking of $\bar{a}$ and $b$, as defining $$\bar{a} \left(\text{and not } \bar{a}+\frac{2\pi}{n}, \text{ or } \bar{a}+\frac{4\pi}{n}, \ldots, \text{ or } \bar{a}+\frac{2(n-1)\pi}{n}\right)$$

I. e. the permanent source must then be viewed as giving the order No. 0 in the sense of 2.1.5. This arrangement provides a firm frame of reference for all phase adjustments.

Note, that if it is desired that a permanent source give a particular organ O the order No. $k$ ($=1, 2, \ldots$) (rather than No. 0), it suffices to insert a phase shift $$\frac{2\pi k}{n}$$

(in the $Si$ wave, i. e. frequency $$\frac{1}{n}f_1$$

in the input channel (i. e. actually $Si'$, not $Si$) leading to O. This can be achieved, e. g. by inserting a delay of $$\frac{k}{n}$$

wavelengths in frequency $$\frac{1}{n}f_1$$

i. e. $k$ wavelengths in frequency $f_1$. Under the conditions of the example of 3.2.3. this is a matter of moderate distances in $cm$ units, i. e. quite conveniently feasible.

(4.1.5) I pass now to the consideration of $Si$ wave power which originates in an organ O.

$Si$ has an amplitude $r$ and a phase $\phi$. The value of $\phi$ (which is quantized to the values $$\bar{\phi}, \bar{\phi}+\frac{2\pi}{n}, \bar{\phi}+\frac{4\pi}{n}, \ldots, \bar{\phi}+\frac{2(n-1)\pi}{n}, \text{ cf. e. g. 2.1.5.})$$

depends on the signal input $Si'$ of the organ O in question, i. e. on the momentary state of the logical (or mathematical) operations of the aggregate—as the whole discussion of 2., 3. shows. I. e. it depends on the information (regarding its present operations) contained in the aggregate.

The value of $r$, on the other hand, is controlled by the $s$ of the power supply $Ps$ that controls the O in question. This $Ps$ has an "$s$ wave" of the shapes shown in Figure 11. Since a shift in time does not matter now, it suffices to consider Figure 11$a$. This is made up by repeating "$s$ waves" like the one shown in Figure 7$a$, and each one of these induces an "$r$ wave" like the one shown in Figure 7$c$. Hence periodic repetition—corresponding to the one which leads from Figure 7$a$ to Figure 11$a$—gives the complete "$r$ wave" of Figure 17. As in Figure 11$a$ two complete periods are shown. The time markers are derived from those of Figure 11$a$: 0, 1, 2 are the same as there, $t_u$ corresponds to $t_a$, $t_v$ is about ⅓ way from $t_b$ to $t_c$. (For Figures 11$b$, $c$, 0, 1, 2 are shifted forward by ⅓ and ⅔ periods, respectively, while $t_a$, $t_b$, $t_c$ must be replaced by $t_b$, $t_c$, $t_a$ and $t_c$, $t_a$, $t_b$, respectively.)

Thus the $Si$ wave is prima facie an amplitude modulated wave of frequency $$\frac{1}{n}f_1$$

consisting of the separate "bursts" $t_u$, $t_v$ (one in each period). At closer examination, however, a phase modulation also appears. Indeed, each "burst" (corresponding to a separate culmination of the "$s$ wave," i. e. also to a separate order in the sense of 2.1.5. received) has a separate (quantized) phase $$\phi = \bar{\phi}, \bar{\phi}+\frac{2\pi}{n}, \bar{\phi}+\frac{4\pi}{n}, \ldots, \bar{\phi}+\frac{2(n-1)\pi}{n}$$

I restate: This phase is constant throughout each individual "burst," but quite independently variable from one "burst" to another.

This peculiar form of phase modulation, then, carries the entire information which is contained in a $Si$ wave. The rate of transmittal of this information is one $n$-way alternative per "burst," i. e. per complete period (in the sense of Figures 11, 17). In the case $n=2$ the above unit becomes a 2-way alternative, i. e. in the terminology of information theory one "bit."

(4.2.1) The considerations of 4.1.5. showed that the $Si$ waves had both amplitude modulation and phase modulation, but that the entire information carried by the $Si$ wave is contained in the phase modulation. This is, of course, the information which makes up the logical (or mathematical) operations of the aggregate. In view of this, the amplitude modulation can be used for other purposes, without interfering with the logical functioning of the aggregate.

This is important, because the fact that the amplitude modulation of each $Si$ wave is reasonably close to its desired pattern shown in Figure 17, constitutes the main guarantee that the entire aggregate, as well as all its parts, are functioning properly. More specifically, for each constituent organ O, the fact that its signal output $Si$ follows in its amplitude modulation the pattern of Figure 17 adequately closely, means that this organ O is in proper adjustment.

Thus, for the crystal diode implementation (cf. 1.3.2.), in particular, it means that the crystal's "forward bias" is properly adjusted with regard to the momentary temperature and physical condition of that crystal. ("Properly" means that it gives operationally satisfactory values to the circuit parameters shown in Figure 1, together with their rates of changes with bias, etc.)

This suggests strongly that the amplitude modulation pattern of each signal output $Si$ be continously monitored, and used to keep its parent organ O in proper adjustment. This monitoring, i. e. observing, is then best made automatic.

(4.2.2) The automatization referred to above is not difficult to achieve, there are clearly several ways along familiar lines to do this. In what follows I will briefly sketch one possible procedure. The monitoring of the shape of the amplitude modulation of a signal output, i. e. of the "$r$ wave" shown in Figure 17 may be limited to observing its mean square value $\overline{r^2}$. This can be done by branching off and intercepting a suitable fraction of the signal output in question (from the $\frac{C}{D}$ end of the channel $\frac{AC}{BD}$ of Figure 5.)

rectifying it and feeding it to a circuit element whose time constant is long compared to the period of the amplitude modulation (i. e. of Figures 11, 17.) In this way an electrical "monitoring signal" obtains, which expresses at all times the momentary value of $\overline{r^2}$. This "monitoring signal" can then be amplified and used to control the adjustment of the organ O referred to above.

Note, that this last mentioned amplification does not occur in the very high frequency domain in which all previous discussions had to be placed. The adjustment control for an organ O must follow its changes in temperature, physical condition, etc. with the time constant with which these fluctuate. This is likely to be much longer than the other durations involved in all previous discussions. I. e. the frequency characteristic of the amplifier, that is needed for the above monitoring-and-feedback-control of adjustments, can cut off at the corresponding frequencies, which are much lower than the very high frequencies referred to above. These automatic adjustments will, of course, not take care of all adjustment requirements of the aggregate and of its components. However, they should take care of the most difficult part of them, the one which is least tractable by non-automatic procedures.

(4.2.3) The automatic monitoring and adjusting of the "$r$" waves of the $Si$ waves, as introduced in 4.2.1. and discussed in detail with respect to one specific procedure in 4.2.2., may furnish the prototype for another operation, too. Indeed, it may be desirable to treat the "$s$ waves" of the $Ps$ waves similarly. Here the shapes prescribed by Figure 11 have to be maintained with reasonable accuracy.

If the monitoring is to be restricted to $\overline{s^2}$, which is quite plausible, then the procedure might be as follows. Figures 11a, b, c all give the same $\overline{s^2}$. It is clearly not necessary to observe the "$s$ wave" near every organ O, i. e. at every such point of the channels

EG
FH according to Figure 5. However, one might, at a few strategic locations along such channels, branch off and intercept a suitable fraction of the power supply in question. From then on the procedure of 4.2.2. can be followed. I. e. this wave power can then be rectified, fed to a circuit element whose time constant is long compared to the period of the present amplitude modulation (i. e. of Figure 11). This furnishes an electrical "monitoring signal," which expresses at all times the momentary value of $\overline{s^2}$. This "monitoring signal" can then be amplified and used to control the adjustment of the corresponding original source of $Ps$ wave power (cf. 3.2.3.), or of some transmission element which controls the entry of this wave power into the area to which this particular "monitoring signals" refers.

It may also be desirable to monitor and control the phases of the culminations of the "$s$ wave" in Figure 11, with respect to the period of that figure. It is clear how this can be done by superposition with a standard wave of this type, feeding through some non-linear device (e. g. a suitably biased rectifier), and then averaging (with a suitably long time constant element), as above, followed by amplification and use for phase (or delay) control.

The remarks made in the latter part of 4.2.2, concerning the moderate frequency cut off requirements for the amplification that is involved in this monitoring-and-feedback-control loop, apply here again. The remark made at the end of 4.2.2. regarding the importance and role of such automatic adjustments is also valid here.

It should be understood that the present disclosure is for the purpose of illustration only and that this invention includes all modifications and equivalents which fall within the scope of the appended claims.

I claim:

1. An organ for the purpose described, comprising an electromagnetic device which has both capacitance and inductance; at least one of these two reactances having a non-linear characteristic, and a resonant frequency for small oscillations around its state of equilibrium, and whose response characteristic has a critical region in which output response to increasing amplitude of an impressed modulated electromagnetic wave power supply begins; an amplitude modulated electromagnetic wave power supply interconnected with said device to impress thereupon a potential at a frequency of which a chosen subharmonic lies near the said resonant frequency of the device, to produce a signal output at said subharmonic frequency, and means for further impressing upon the device, as the increasing amplitude of the impressed modulated wave power moves in the said critical region of its response characteristic, an input signal at the frequency of the signal output and of chosen phase whereby the phase of the signal output is unambiguously determined.

2. In a logical machine, a series of interconnected organs with amplitude-modulated power supplies according to claim 1, in combination with means for timing the amplitude modulation of successive power supplies so that the power supply amplitude of a preceding organ has passed through the critical region of its response characteristic before the signal response of the next succeeding organ begins, whereby the output signal of each organ is effective as an input signal to control the signal output of the succeeding organ in the series but ineffective to control the output of the preceding organ.

3. A logical machine according to claim 2 wherein said series of interconnected organs includes three or more of said organs.

4. An organ for the purpose described comprising an electromagnetic device having both capacitance and inductance, one of these two reactances having a non-linear characteristic, and a resonant frequency for small oscillations around its state of equilibrium, and whose response characteristic has a critical region in which output response to increasing amplitude of an impressed modulated electromagnetic wave power supply begins; a power supply for impressing upon said organ an amplitude modulated electromagnetic wave having a frequency of which a chosen $n^{th}$ subharmonic lies near the said resonant frequency of the device, to produce an amplitude modulated signal output electromagnetic wave whose frequency is a subharmonic of the impressed frequency and whose modulation envelope follows the modulation envelope of said power supply wave, said signal output being initiated when the increasing amplitude of said power supply passes through the critical region of the said response characteristic and having $n$ possible phases each differing from the other by $$\frac{2\pi}{n}$$

radians, and an input signal supply for impressing upon said organ in said critical region an electromagnetic wave of the frequency of said signal output and of chosen phase to unambiguously select from the $n$ possible phases a desired signal output phase, $n$ being an integer greater than 1.

5. In a logical machine, a series of interconnected organs with amplitude-modulated power supplies according to claim 4, in combination with means for timing the amplitude modulation of successive power supplies so that the power supply amplitude of a preceding organ has passed through the critical region of its response characteristic before the signal response of the next succeeding organ begins, whereby the output signal of each organ is effective as an input signal to control the signal output of the succeeding organ in the series but ineffective to control the output of the preceding organ.

6. A logical machine according to claim 5 wherein said series of interconnected organs includes three or more of said organs.

7. An organ for the purpose described, comprising a crystal diode having a non-linear capacitance characteristic, and a resonant frequency for small oscillations around its state of equilibrium, and whose response characteristic has a critical region in which output response to increasing amplitude of an impressed modulated electromagnetic wave power supply begins; an amplitude modulated electromagnetic wave power supply interconnected therewith to impress thereupon a potential at a frequency of which a chosen subharmonic lies near the said resonant frequency to produce a signal output at said subharmonic frequency, and means for further impressing upon the diode as the increasing amplitude of the impressed modulated wave power moves in the critical region of the said response characteristic an input signal at the frequency of the signal output and of chosen phase whereby the phase of the signal output is unambiguously determined by the phase of the input signal.

8. An organ according to claim 7 in which the subharmonic frequency is one-half the power supply frequency.

9. In a logical machine, a series of interconnected organs with amplitude-modulated power supplies according to claim 7, in combination with means for timing the amplitude modulation of successive power supplies so that the power supply amplitude of a preceding organ has passed through the critical region of its response characteristic before the signal response of the next succeeding organ begins, whereby the output signal of each organ is effective as an input signal to control the signal output of the succeeding organ in the series but ineffective to control the output of the preceding organ.

10. A logical machine according to claim 9 wherein said series of interconnected organs includes three or more of said organs.

References Cited in the file of this patent
UNITED STATES PATENTS 2,514,678   Southworth _____ July 11, 1950

UNITED STATES PATENT OFFICE
Certificate of Correction

Patent No. 2,815,488 December 3, 1957

John Von Neumann

It is hereby certified that error appears in the printed specification of the above numbered patent requiring correction and that the said Letters Patent should read as corrected below.

Column 5, line 47, for "on $\phi$" read —on $\bar{\phi}$—; line 51, for "Increasing $2\phi$" read —Increasing $2\bar{\phi}$—; line 52, for "by $2\phi$" read —by $2\bar{\phi}$—; line 61, for "$2\phi$ by $2\phi$" read —$2\bar{\phi}$ by $2\bar{\phi}$—; line 62, for "$\phi$ by $\phi$" read —$\bar{\phi}$ by $\bar{\phi}$—; line 68 for "show, $2\phi$" read —show, $2\bar{\phi}$—; line 70, for "$\phi$ to $\phi$" read —$\bar{\phi}$ to $\bar{\phi}$—; column 7, line 3, for "$\phi$=" read —$\bar{\phi}$+—; column 10, line 32, for $$4\pi \quad \text{read} \quad \frac{4\pi}{n}$$

column 13, line 6, for "$\phi$" read —$\bar{\phi}$—; column 17, line 2, for "$a$" read —$\bar{a}$—; line 15, for "$\bar{a}_{1\lambda}$" read —$a_{1\lambda}$—; column 18, line 55, for $$\frac{AC}{BD}. \quad \text{read} \quad \frac{AC}{BD},$$

column 22, lines 3 and 4, for $$\frac{1}{n}f_1 \quad \text{read} \quad \frac{1}{n}f_1\Big)$$

Signed and sealed this 11th day of February 1958.

[SEAL]

Attest:
KARL H. AXLINE,
*Attesting Officer.*

ROBERT C. WATSON,
*Commissioner of Patents.*